(12) United States Patent
Noma et al.

(10) Patent No.: US 7,349,580 B2
(45) Date of Patent: Mar. 25, 2008

(54) APPARATUS AND METHOD FOR CALIBRATING ZOOM LENS

(75) Inventors: Takayuki Noma, Tokyo (JP); Hitoshi Otani, Tokyo (JP); Nobuo Kochi, Tokyo (JP)

(73) Assignee: Topcon Corporation, Tokyo (JP)

( * ) Notice: Subject to any disclaimer, the term of this patent is extended or adjusted under 35 U.S.C. 154(b) by 590 days.

(21) Appl. No.: 10/858,468

(22) Filed: Jun. 2, 2004

(65) Prior Publication Data

US 2005/0013504 A1    Jan. 20, 2005

(30) Foreign Application Priority Data

Jun. 3, 2003 (JP) .............................. 2003-158393

(51) Int. Cl.
G06K 9/40 (2006.01)
G03B 17/00 (2006.01)
G02B 13/16 (2006.01)
H04N 5/225 (2006.01)

(52) U.S. Cl. .................... 382/255; 396/87; 348/335

(58) Field of Classification Search ................ 382/255, 382/254, 298, 312, 318; 396/72, 79, 87; 356/6; 702/85; 348/335, 345, 347
See application file for complete search history.

(56) References Cited

U.S. PATENT DOCUMENTS 6,618,559 B1 * 9/2003 Hofer .......................... 396/87

2005/0007477 A1 * 1/2005 Ahiska ........................ 348/335
2005/0122400 A1 * 6/2005 Kochi et al. ............ 348/207.99

FOREIGN PATENT DOCUMENTS

JP    9-329418 A    12/1997

* cited by examiner

Primary Examiner—Yon J. Couso
(74) Attorney, Agent, or Firm—Foley & Lardner LLP

(57) ABSTRACT

A calibrating apparatus for a zoom lens comprising: a first image-acquiring section 60 for acquiring a first image-for-calibration by photographing an area, in which reference marks for calibration are positioned, with a photographic device-to-be-calibrated 19 whose focal length is set to a first focal length; a second image-acquiring section 62 for acquiring a second image-for-calibration by photographing the area, in which the reference marks for calibration are positioned, with the photographic device-to-be-calibrated 19 whose focal length is set to a second focal length; a correction coefficient calculating section 64 for calculating a calibration correction coefficient for the first and second focal lengths, with the use of the photographed reference marks in the first and second image-for-calibrations: and a reference mark inferring section 66 for inferring a positional relationship of the photographed reference marks for calibration in the second image-for-calibration, with the use of the photographed reference marks for calibration in the first image-for-calibration.

17 Claims, 16 Drawing Sheets

120: zooming area

CALIBRATION IMAGE AT A PRIOR FOCAL LENGTH

CALIBRATION IMAGE AT A PRESENT FOCAL LENGTH

CALIBRATION IMAGE AT
A PRIOR FOCAL LENGTH

CALIBRATION IMAGE AT
A PRESENT FOCAL LENGTH

FOCAL LENGTH INFORMATION

400:PHOTOGRAPHING APPARATUS

APPARATUS AND METHOD FOR CALIBRATING ZOOM LENS

BACKGROUND OF THE INVENTION

This invention relates to an apparatus having a calibration field and a method for measuring internal parameters, such as a principal point position, a screen distance (focal length) and a distortion parameter of a lens, necessary to correct an image distortion of a camera and particularly relates to an apparatus and method for calibration suitable for use in calibration of a camera having a zoom lens.

Conventionally, in the field of photogrammetry or photographic measurement it has been important to obtain an image with less aberration. For this purpose, in these fields a high-accuracy lens with small aberration has been used for a photographic camera. Further, in the field of photogrammetry, multiple points positioned in precisely measured three dimension are measured in plural directions and then the internal parameters, such as a principal point position, a screen distance (focal length) and a distortion parameter, of a camera are analytically obtained, as disclosed in JP-A-9-329418. On the other hand, in the field of photographic measurement, the internal parameters of a fabricated camera are obtained by precisely measuring the camera.

These methods for obtaining the internal parameters of a camera are adapted to calibrate a fixed-focus camera. In general, objects to be measured may have a variety of sizes and there may exist an obstacle to a measurement work. In such cases, for the fixed-focus camera, the object distance thereof is limited. Thus, the fixed-focus camera is given merely an inappropriate angle, resulting in a degraded accuracy of measurement, for example. To the contrary, in a camera provided with a zooming function, such as a modern digital camera and video camera, its focal length can be variably adjusted. Accordingly, a selection of an appropriate focal length for a zoom lens will allow to take an appropriate image of an object to be photographed even if there is an obstacle which limits the object distance.

However, the focal length of the zoom lens is variable within a range from a zooming area to a wide-angle area and a calibration work must be therefore repeated for respective focal lengths. It is therefore a problem that mere application of the method suitable for the fixed-focus camera to obtain internal parameters thereof to the zoom lens complicates the calibration work thereon. In other words, although the focal length of the zoom lens can be adjusted in both ranges of a wide-angle side and a zooming side, the position where an image is taken must be changed corresponding to each change of the focal length. This complicates calibration works. When the focal length of the zoom lens is set within the zooming side, it is required to fully secure a distance between the camera and a three-dimensional field for calibration in which a number of points measured precisely and distributed three-dimensionally are included. It is therefore a problem that an extensive space is required for calibration works. When the focal length of the zoom lens is set within the wide-angle side, a wider structure is needed as a three-dimensional field. Accordingly, it is also a problem that construction cost of the three-dimensional field is necessarily increased.

SUMMARY OF THE INVENTION

The invention was made to solve the problems described above and a first object of the invention is to provide an apparatus and a method for calibration suitable for use in calibration of a zoom lens.

To realize the first object, as shown in FIG. 1, a calibrating apparatus for a zoom lens of the invention comprises: a first image-acquiring section 60 for acquiring a first image-for-calibration by photographing an area, in which reference marks for calibration are positioned, with a photographic device-to-be-calibrated 19 whose focal length is set to a first focal length; a second image-acquiring section 62 for acquiring a second image-for-calibration by photographing the area, in which the reference marks for calibration are positioned, with the photographic device-to-be-calibrated 19 whose focal length is set to a second focal length; a correction coefficient calculating section 64 for calculating a calibration correction coefficient for the first and second focal lengths, with the use of the photographed reference marks in the first and second image-for-calibrations; and a reference mark inferring section 66 for inferring a positional relationship of the photographed reference marks for calibration in the second image-for-calibration, with the use of the photographed reference marks for calibration in the first image-for-calibration.

In an apparatus constituted in such a manner as described, the first image-acquiring section 60 acquires the first image-for-calibration by photographing an area, in which reference marks for calibration are positioned, with a photographic device-to-be-calibrated 19 whose focal length is set to the first focal length. The second image-acquiring section 62 acquires the second image-for-calibration by photographing the area, in which the reference marks for calibration are positioned, with the photographic device-to-be-calibrated 19 whose focal length is set to the second focal length. A correction coefficient calculating section 64 calculates a calibration correction coefficient for the first and second focal lengths, with the use of the photographed reference marks in the first and second image-for-calibrations. With the use of the photographed reference marks for calibration in the first image-for-calibration, a positional relationship of the photographed reference marks for calibration in the second image-for-calibration is inferred by a reference mark inferring section 66. It is therefore easy for the correction coefficient calculating section 64 to calculate a calibration correction coefficient for the second focal length.

In the calibrating apparatus for a zoom lens of the invention, it is preferred to constitute the photographic device-to-be-calibrated 19 so as to photograph the area, in which the reference marks for calibration are positioned, for each of a series of sequential focal lengths including the first and second focal lengths. The positions of the reference marks will be changed sequentially and it is therefore easy to search the positions of the reference marks.

The calibrating apparatus for a zoom lens of the invention preferably further comprises a reference mark position information database section 65 for storing three-dimensional position information of the reference marks in the area in which they are positioned, and the reference mark inferring section 66 comprises: a duplicate reference mark extracting section 67 for extracting a group of the reference marks matched between the photographed reference marks for calibration in the first image-for-calibration and the photographed reference marks for calibration in the second image-for-calibration; and an additional reference mark position information extracting section 68 for extracting, from the reference mark image in the second image-for-calibration, additional reference marks which any reference marks in the first image-for-calibration do not match, and for reading the three-dimensional position information relating to the additional reference marks, with reference to the reference mark position information database section 65. It is easy to identify unique reference marks for calibration in the photographed second image-for-calibration on the basis of the reference marks for calibration which were projected in the first image-for-calibration taken with the photographic device-to-be-calibrated 19.

In the calibrating apparatus for a zoom lens of the invention, it is preferred to constitute the reference mark inferring section 66 so as to infer the positional relationship in the photographed reference marks for calibration in the second image-for-calibration with the use of information on positions of the reference marks for calibration projected in the first image-for-calibration and also information on the first and second focal lengths. Since a contraction scale of the first and second image-for-calibrations taken with the photographic device-to-be-calibrated 19 can be inferred from the information on the first and second focal lengths, it is easy to infer the positional relationship between the reference marks for calibration that were projected in the first image-for-calibration and the reference marks for calibration that were projected in the second image-for-calibration.

To realize the first object, as shown in FIG. 2, a method of calibrating a zoom lens of the invention comprises the steps of: photographing an area, in which reference marks for calibration are positioned, with a photographic device-to-be-calibrated 19 whose focal length is set to a first focal length, and acquiring a first image-for-calibration (S302 and S304); calculating a calibration correction coefficient for the first focal length, with the use of the photographed reference marks in the first image-for-calibrations (S306); photographing the area, in which the reference marks for calibration are positioned, with the photographic device-to-be-calibrated 19 whose focal length is set to a second focal length in the vicinity of the first focal length, and acquiring a second image-for-calibration (S308 and S310); inferring a positional relationship of the photographed reference marks for calibration in the second image-for-calibration, with the use of the photographed reference marks for calibration in the first image-for-calibration (S312); and calculating a calibration correction coefficient for the second focal length, with the use of the photographed reference marks in the second image-for-calibrations (S314).

If three or more focal lengths to be calibrated are given, it is preferred to further provide, subsequent to the step S314, a step of inquiring whether treatment on all of the focal lengths for acquiring their correction coefficients has been completed or not (S316). If not completed in this step 316, then a new second focal length is given instead of the prior second focal length (S318) and subsequently the process is returned to the step S308. In this case, the value of the new second focal length may be replaced with that of the prior first focal length in the step S318. It is also preferred to provide a step of obtaining an approximate expression which represents a calibration correction coefficient of the photographic device-to-be-calibrated as a function of the focal length when the treatment has been completed in the step S316 (S320). In the process (S320), a calibration correction coefficient for each of other focal lengths, in other words, those in case of a zoom lens, for which images for calibration were not photographed, can be obtained from the calibration correction coefficient which was acquired from the actually photographed image for calibration.

A calibrating apparatus for a zoom lens of the invention comprises: a first image-acquiring section for acquiring a first image-for-calibration by photographing an area, in which reference mark for calibration are positioned, with a photographic device-to-be-calibrated whose focal length is set to a first focal length; a second image-acquiring section for acquiring a Second image-for-calibration by photographing the area, in which the reference marks for calibration are positioned, with the photographic device-to-be-calibrated whose focal length is set to a second focal length; a correction coefficient calculating section for calculating a calibration correction coefficient for the first, the second focal lengths and other focal lengths, with the use of the photographed reference marks in the first and second image-for-calibrations. In the calibrating apparatus for a zoom lens of the invention, it is preferred to constitute to that the other focal lengths is not used by any of image-acquiring sections.

As shown in FIG. 16, a photographing apparatus for using the calibration correction coefficient obtained in claim 1 to 7, comprises: a photographing section 410 for photographing an object in which includes a valuable focal length lens; image processing section 430 for image processing a photographed image with the calibration correction coefficient in accordance with of a focal length of the valuable focal length lens when the photographed image was photographed.

This application is based on Japanese patent application, No. 2003-158393 filed in Japan on June 3, which is entirely incorporated herein by reference. The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description. The applicant has no intention to give to public any disclosed embodiment. Among the disclosed changes and modifications, those which may not literally fall within the scope of the patent claims constitute, therefore, a part of the present invention in the sense of doctrine of equivalents.

DESCRIPTION OF THE PREFERRED EMBODIMENTS

Figure 1:
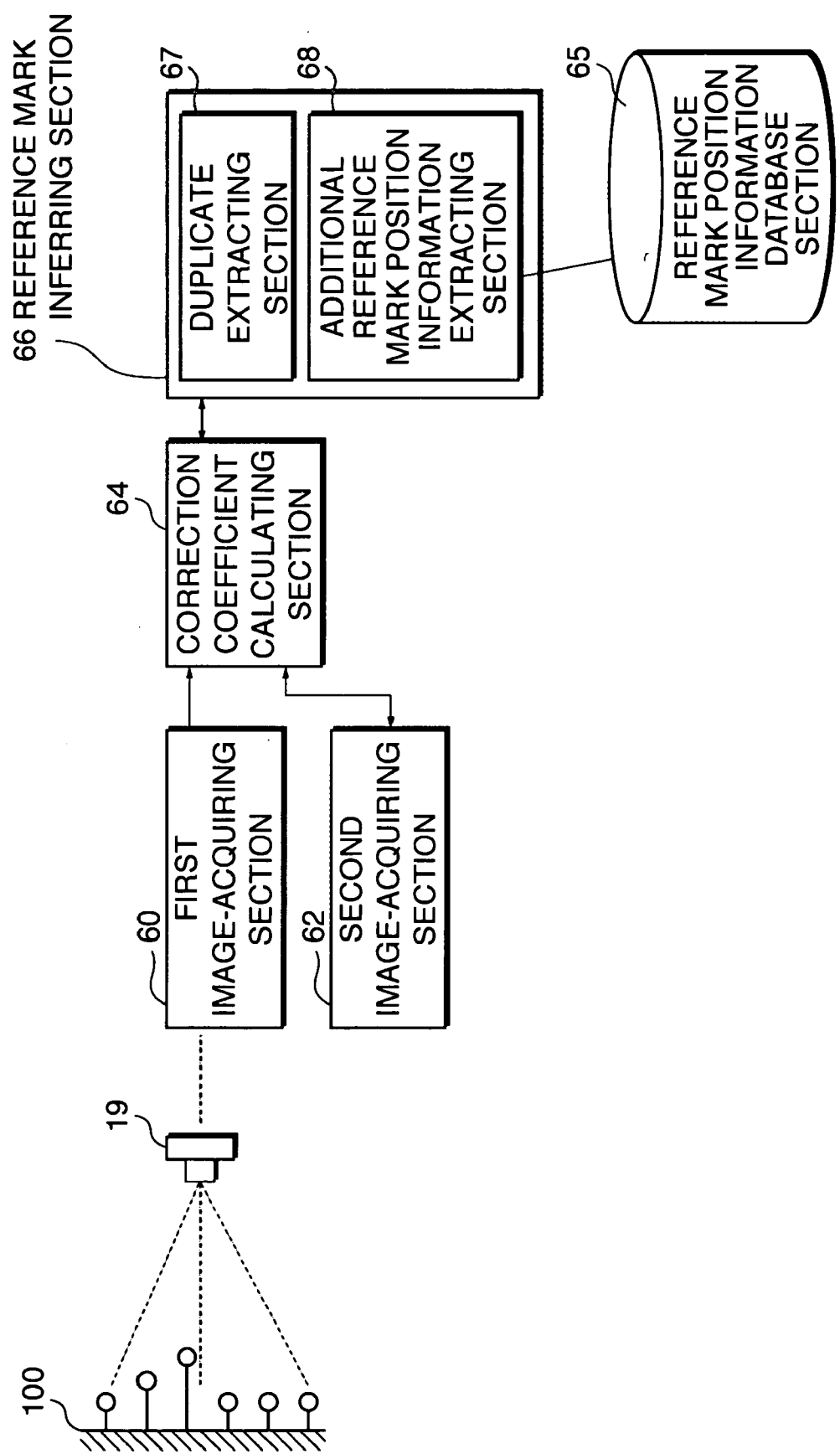
FIG. 1 is an overall block diagram, illustrating a first embodiment of the invention.
Figure 2:
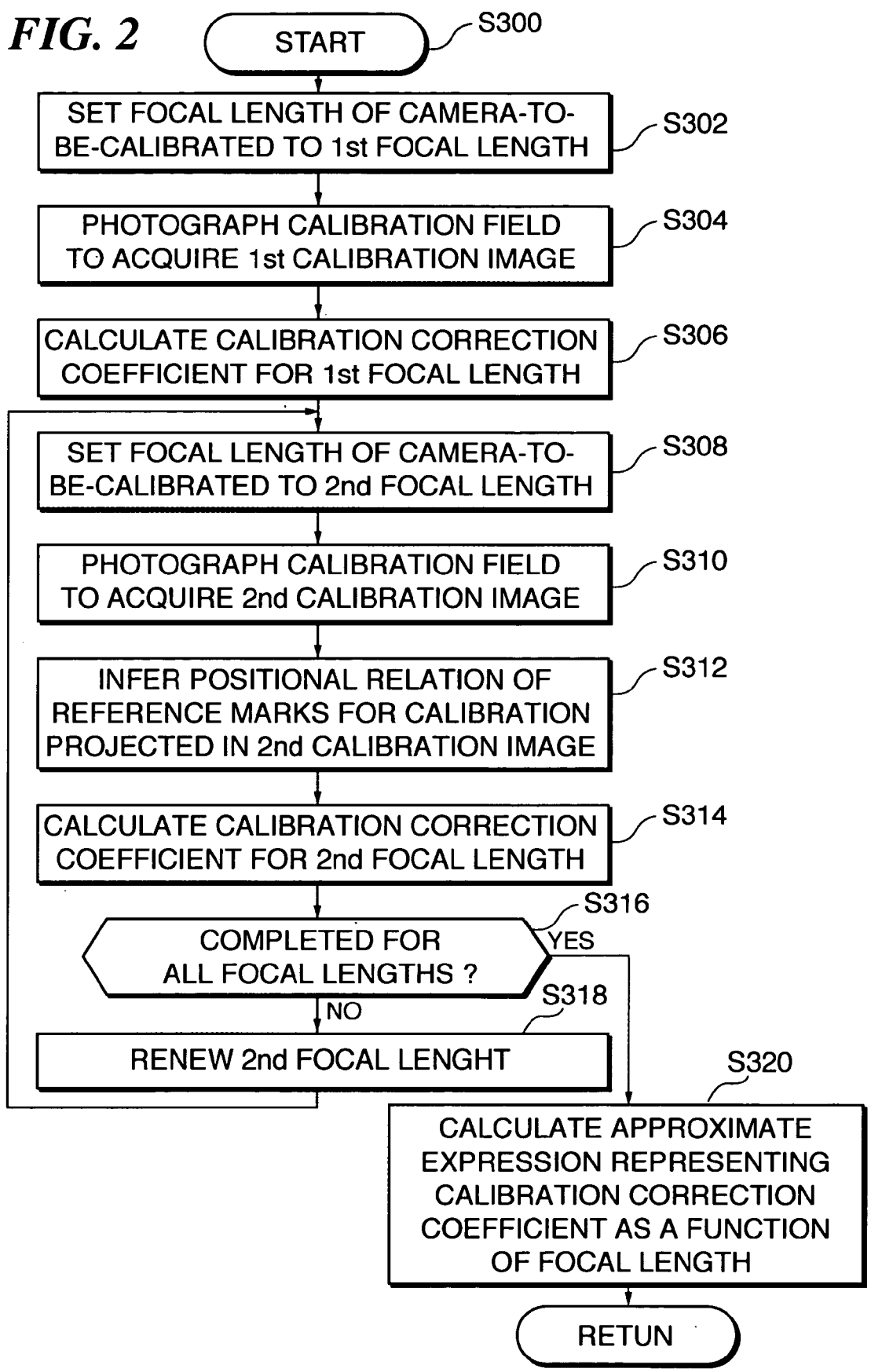
FIG. 2 is a flow chart, illustrating a procedure of a calibration work with a zoom lens.

The invention is hereinafter described with reference to the accompanying drawings, in which: FIG. 1 is an overall block diagram, illustrating a first embodiment of the invention. In the figure, the inventive apparatus for calibrating a zoom lens includes a first image-acquiring section 60, a second image-acquiring section 62, a correction coefficient calculating section 64, a reference mark position information database section 65, a reference mark inferring section 66. The reference mark inferring section 66 includes a duplicate reference mark extracting section 67 and an additional reference mark position information extracting section 68. A digital camera and a video camera or the like with a zoom lens of a variable focal length type are used as a photographic device-to-be-calibrated 19. An image can be acquired with the photographic device-to-be-calibrated 19 by variably and continuously adjusting the focal length of the zoom lens.

The first image-acquiring section 60 acquires a first image-for-calibration by photographing an area, in which reference marks for calibration are positioned (this area is hereinafter referred to as a three-dimensional field for calibration 100), with a photographic device-to-be-calibrated 19 whose focal length is set to a first focal length. The second image-acquiring section 62 acquires a second image-for-calibration by photographing the three-dimensional field for calibration 100, with the photographic device-to-be-calibrated 19 whose focal length is set to a second focal length. Here, the first and second focal lengths of the photographic device-to-be-calculated 19 are set to be close to each other and both reference marks for calibration that are projected in the first and second image-for-calibrations, respectively, are similar to each other. This allows a smooth calibration work. When the photographic device-to-be-calibrated 19 has a large zoom ratio, the focal length is changed in a multi-step manner with the ratio of the second focal length to the first focal length being kept smaller (for example, 1.2 to 1.5). Then, for the focal length preset in a multi-step, each set of the first and second focal lengths to be read may be changed and read one by one using a neighboring set of the first and second focal lengths. Use of a zooming function to continuously adjust the focal length permits to exactly show a relation in which the correction coefficient of the photographic device-to-be-calibrated 19 depends on the focal length. Also, since the ratio of the first focal length to the second focal length is kept smaller, the calibration correction coefficient can be efficiently obtained without vain increase of the number of focal lengths to be measured.

With the reference marks for calibration projected in the first and second image-for-calibrations, the correction coefficient calculating section 64 calculates respective correction coefficients for the first and second focal lengths of the photographic device-to-be-calibrated 19, which will be later described in detail. In the reference mark position information database section 65 is stored three-dimensional position information of the reference marks in the three-dimensional field for calibration 100. The reference mark inferring section 66 infers a positional relationship of the photographed reference marks for calibration in the second image-for-calibration, with the use of the photographed reference marks for calibration in the first image-for-calibration. Since the focal length of the photographic device-to-be-calibrated 19 can be varied continuously, a search area and a template size for use in the correction coefficient calculating section 64 can be also varied using the information on the zoom ratio defined by the focal length.

The duplicate reference extracting section 67 extracts a group of the reference marks matched between the photographed reference marks for calibration in the first image-for-calibration and the photographed reference marks for calibration in the second image-for-calibration. The additional reference mark position information extracting section 68 extracts, from the reference mark image in the second image-for-calibration, additional reference marks which any reference marks in the first image-for-calibration do not match, and reads the three-dimensional position information relating to the additional reference marks with reference to the reference mark position information database section 65.

Figure 3:
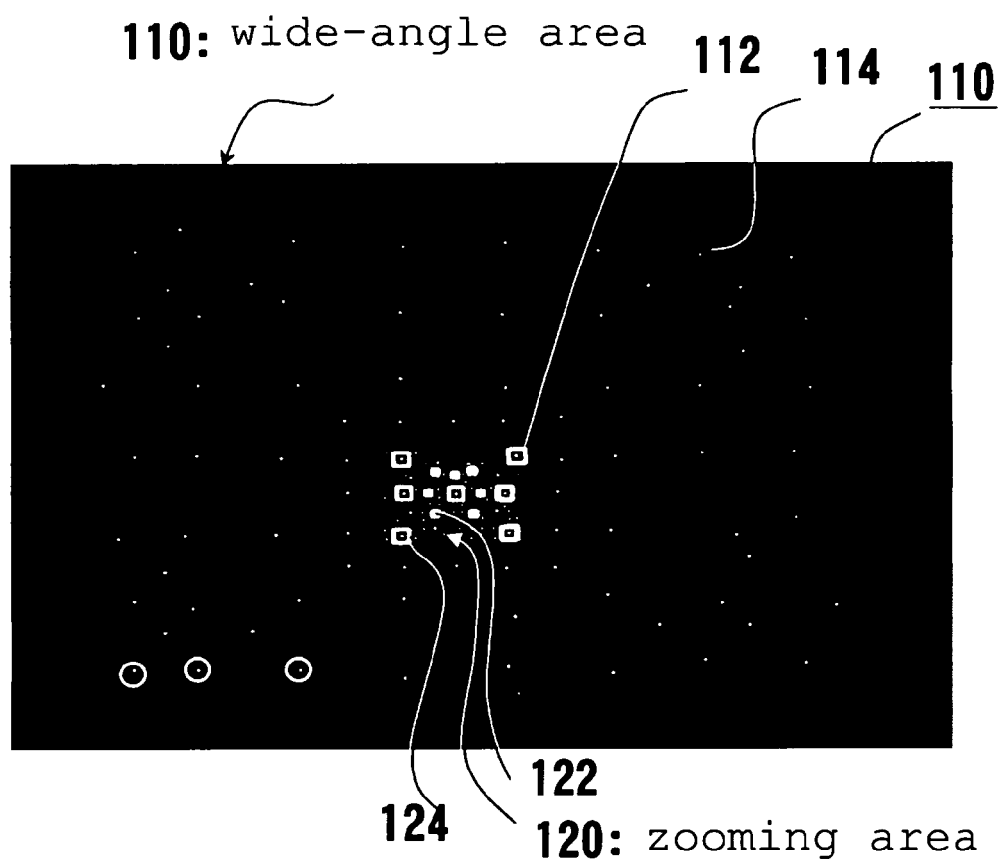
FIG. 3 is an overall view, illustrating a three-dimensional field for calibration which is shown as a light and shade binary image.
Figure 4:
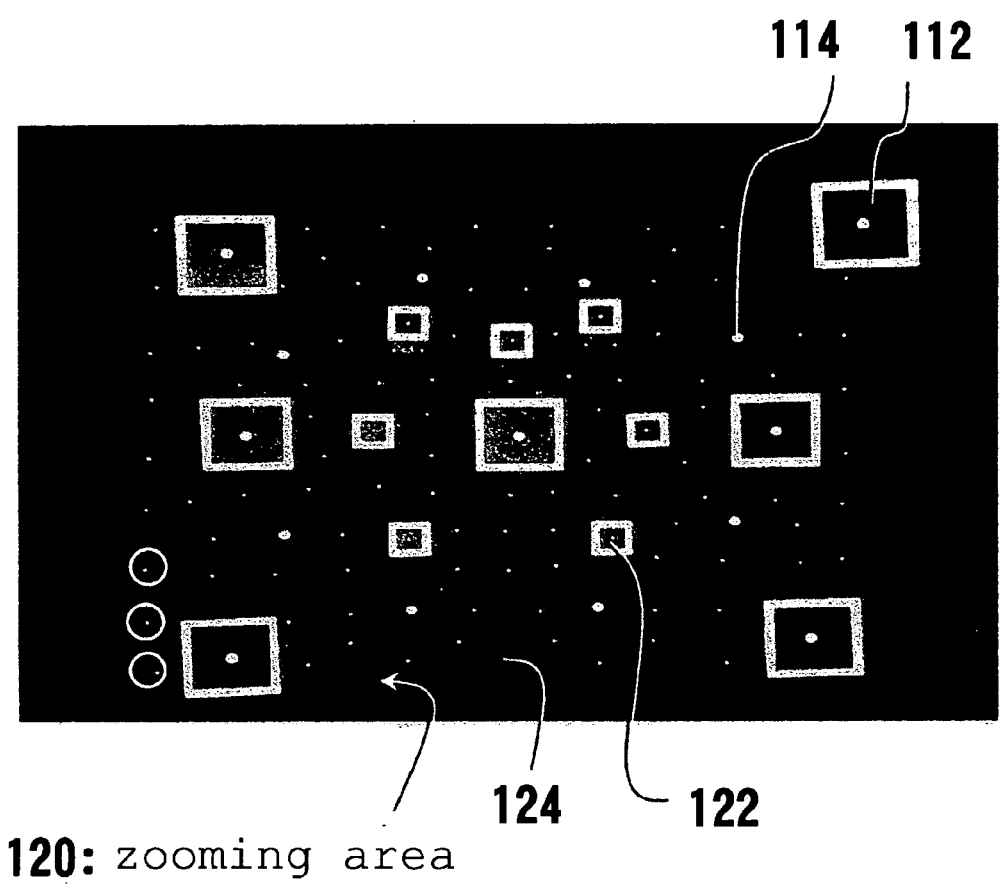
FIG. 4 is a partially enlarged view of a three-dimensional field for calibration, showing a zooming area as a light and shade binary image.

FIG. 3 is an overall view, illustrating a three-dimensional field for calibration which is shown as a light and shade binary image. FIG. 4 is a partially enlarged view of a three-dimensional field for calibration, showing a zooming area as a light and shade binary image. In these figures, the three-dimensional field for calibration 100 has a wide-angle area 110 and a zooming area 120 which is located within an area overlapped with the wide-angle area 110.

The wide-angle area 110 is used to take a calibration image on the wide-angle side of a zoom lens and also provided with a rough alignment reference marks 112 for wide-angle for use in rough alignment in a photographed calibration image and provided with precise alignment reference marks 114 for wide-angle for use in precise alignment in the photographed calibration image. In the vicinity of the zooming area 120 are provided seven rough alignment reference marks 112 for wide-angle so that it is secured to photograph even though the zoom lens has a smaller angle of view. For example, 100 to 200 of the precise alignment reference marks 114 for wide-angle are evenly distributed with a density so as to be projected evenly on a photographed calibration image. The rough alignment reference marks 112 for wide-angle have a center in a shape of, for example, a circle (a star and a triangle also permitted) and a closing line in a shape of a rectangular which circumscribes the center. Alternatively, the closing line may be in a shape of a circle and a polygon other than a triangle. In other words, any other shape by which the rough alignment reference mark 112 for wide-angle can be clearly identified may be used.

The zooming area 120 is used to take a calibration image on the zooming side of the zoom lens and also provided with rough alignment reference marks 122 for zooming for use in rough alignment in a photographed calibration image and provided with precise alignment reference marks 124 for zooming for use in precise alignment in the photographed calibration image. Since the zooming area 120 is located in a small area surrounded by the wide-angle area 110, the calibration image can be photographed with a zoom lens which has a small angle of view and of which focal length is set on the zooming side, even if an distance between the photographic camera and the three-dimensional field is not enough.

In the vicinity of the center of the zooming area 120 are provided seven rough alignment reference marks 122 for zooming so that it is secured to photograph even though the zoom lens has a smaller angle of view. For example, 100 to 200 of the precise alignment reference marks 124 for zooming are evenly distributed with a density so as to be projected evenly on the photographed calibration image. The rough alignment reference marks 122 for zooming have a center and a closing line, each in the same shape as of the rough alignment reference marks 124 for zooming. Alternatively, the closing line may be in a shape of a circle and a polygon other than a triangle. In other words, any other shape by which the rough alignment reference mark 122 for zooming can be clearly identified may be used.

The rough alignment reference marks 112 for wide-angle have a geometry larger than that of the rough alignment reference marks 122 for zooming; and the precise alignment reference marks 114 for wide-angle have a geometry larger than that of the precise alignment reference 124 marks for zooming. Accordingly, the reference marks 122, 124 for zooming which were photographed on the wide-angle side of the zoom lens have a small size in the photographed calibration image. It is therefore easy to identify the reference marks 112, 114 for wide-angle. Also, the reference marks 122, 124 for zooming which were photographed on the zooming side of the zoom lens are projected with a size suitable to be identified in the photographed calibration image.

Figure 5:
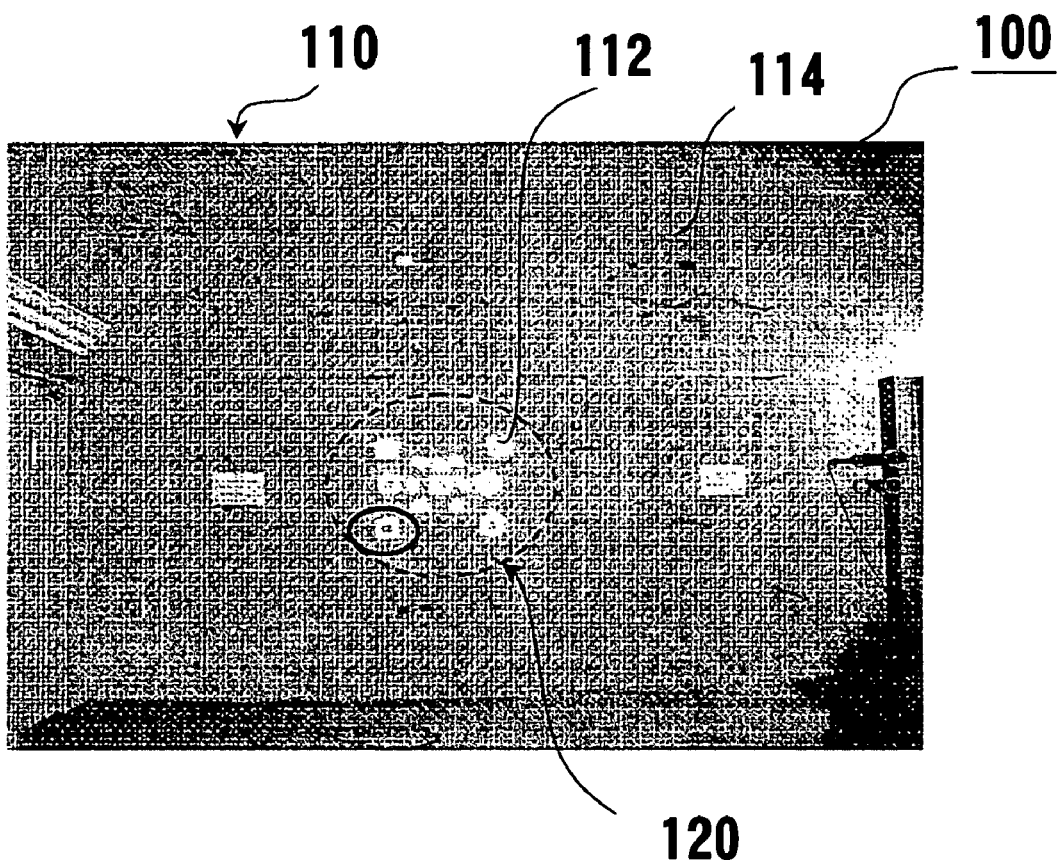
FIG. 5 is an overall view, illustrating a site where a three-dimensional field for calibration is placed.
Figure 6:
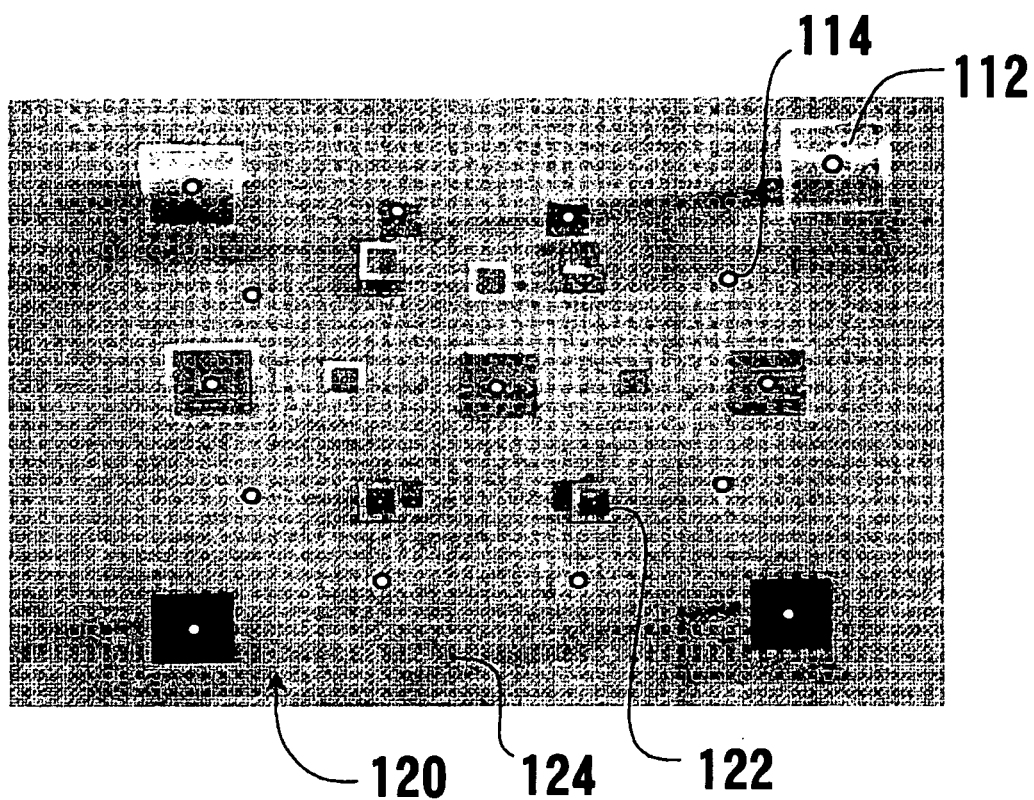
FIG. 6 is a partially enlarged view of the three-dimensional field of FIG. 5, illustrating a zooming area.

Next, a site where the three-dimensional field for calibration 100 is placed will be described, with reference to the drawings. FIG. 5 is an overall view, illustrating the site where the three-dimensional field for calibration 100 is placed, and FIG. 6 is a partially enlarged view of FIG. 5 as an overall view of the three-dimensional field for calibration 100, illustrating a zooming area. The three-dimensional field for calibration 100 is provided in an environment of a less variation of temperature, for example, a basement or cellar so that the relative positions between the reference marks for wide-angle and the reference marks for zooming cannot be varied. On a wall surface, such as a concrete wall, is fixed a target board indicating the reference marks 112, 114 for wide-angle and the reference marks 122, 124 for zooming.

For each of the reference marks 112, 114, 122, 124, a reflective reference target having a high reflectivity is used, resulting in an easy photographing of a calibration image as a light and shade binary image. By use of a reference mark having a high reflectivity, such as a glass plate, on which aluminium is deposited, the reference marks having a high intensity are projected on a photographed calibration image. It is therefore easy to obtain a sufficient contrast between the reference marks and the background of the three-dimensional field for calibration 100. The height of the reference mark is adjusted by changing the height of the target board from the surface of a concrete wall, for example. Evenly locating the reference marks having a variety of heights all over the calibration image, internal parameters of the zoom lens to be calibrated are exactly calculated.

Figure 7:
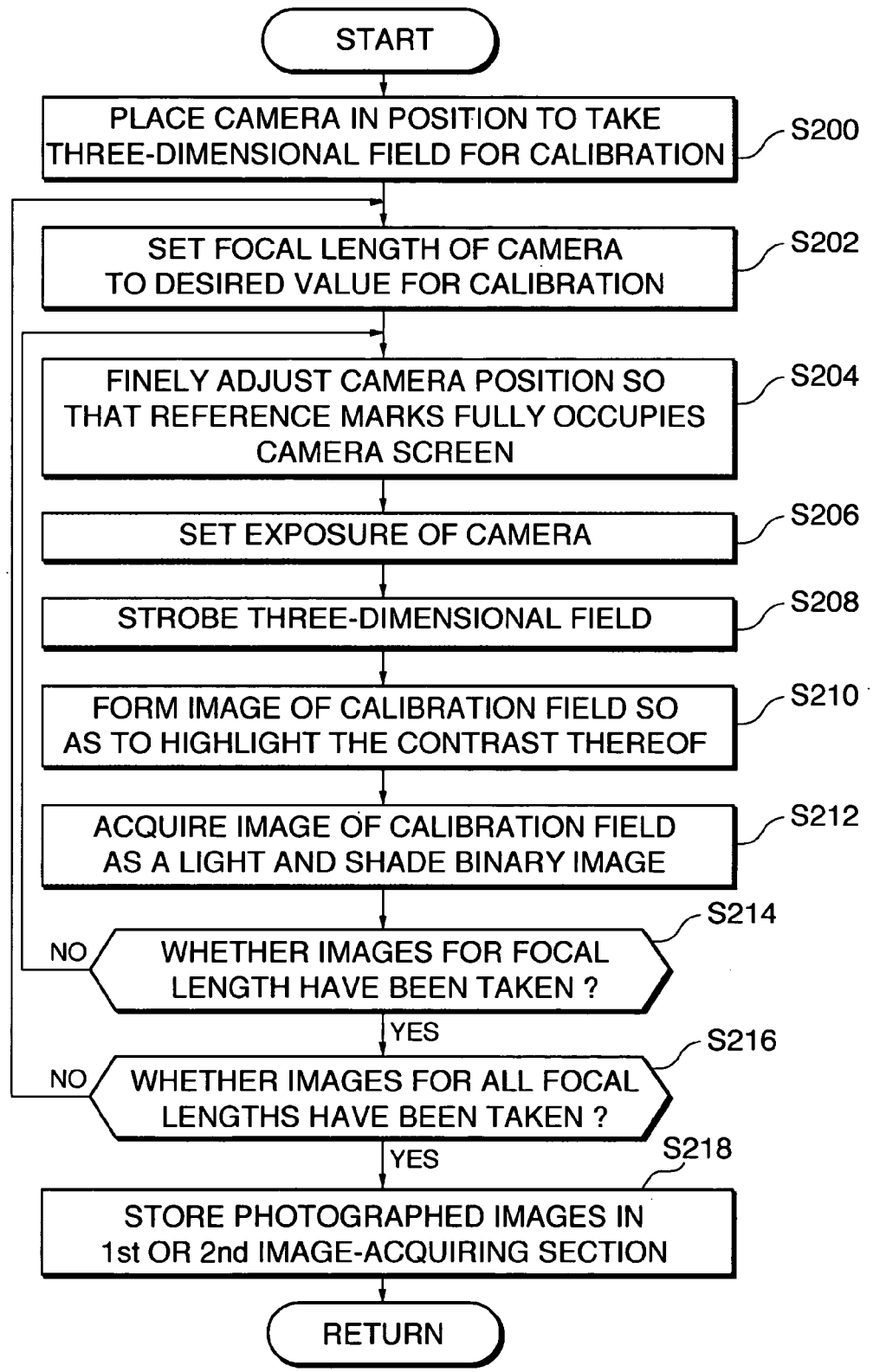
FIG. 7 is a flow chart, illustrating a procedure of photographing, with a zoom lens to be calibrated, a three-dimensional field for calibration.

FIG. 7 is a flow chart, illustrating a procedure of photographing the three-dimensional field for calibration 100 with a zoom lens to be calibrated. First, the photographic device-to-be-calibrated 19 (or a camera with a zoom lens to be calibrated) is placed in position to photograph the three-dimensional field for calibration 100 (S200). The focal length of the photographic device-to-be-calibrated 19 is then set to a desired value for calibration (S202). The focal length is preferably set to a value on the wide-angle side of the zoom lens, but may be on the zooming side. Next, the position of the camera is adjusted so that the reference marks in the three-dimensional field for calibration 100 can fully occupy the screen of the photographic device-to-be-calibrated 19 (S204). In the photographic device-to-be-calibrated 19, if the focal length thereof is on the wide-angle side then it is set such that the reference marks 112, 114 for wide-angle are projected. If on the zoom side then the focal length is set such that the reference marks 122, 124 are projected.

Then the exposure of the camera for photographing a calibration field is set to be overexposed for an background excluding the reference marks of the three-dimensional field for calibration 100, and to be underexposed for the reference marks of the three-dimensional field for calibration 100 (S206). Secondly, the three-dimensional field for calibration 100 is photographed by strobing with the camera for photographing a calibration image (S208). In this step, since the calibration field can be photographed with the zoom lens for which aperture is closed at a minimum value, a depth of field becomes deep. It is therefore easy to obtain a clear image for analysis even if be photographed out of focus.

Subsequently, the image of the calibration is formed so as to highlight the contrast thereof (S210). The image of the calibration photographed in such a manner is a binary image in which a background image, such as a concrete wall surface, of the three-dimensional field for calibration is shaded and both the reference marks 112, 114 for wide-angle and the reference marks 122, 124 are lightened (S212).

Subsequently, it is determined whether all of the images necessary for calibration have been taken by the photographic device-to-be calibrated 19 (S214). After completion of taking the required number of images for one focal length, it is determined whether or not images have been taken for all of the required focal lengths by the photographic device-to-be-calibrated 19 (S216). If determined not to be completed, the process returns to the step S202 to perform again the steps for next focal length necessary for calibration and repeats these steps, if required. For example, the zoom lens of the photographic device-to-be-calibrated 19 is adjusted for desired number of focal lengths to be interpolated and steps S202 to S216 are performed repeatedly. It is preferred that the number of the focal length for calibration images for the photographic device-to-be-calibrated 19 is determined depending on a required accuracy of calibration. The number of the focal length may be also determined depending on the range of the zoom lens. The minimum number of the focal length is two. Three or more focal lengths may be also allowed. If the number of focal length is five in a range from the wide-angle to the zooming areas of the photographic device-to-be-calibrated 19, then the sequential steps will be repeatedly performed five times. Accordingly, when the focal length of the photographic device-to-be-calibrated 19 is changed, the position of the camera is correspondingly changed so that the calibration image can be taken so as to fully occupy the screen of the photographic device-to-be-calibrated 19. These sequential steps are repeated.

After completion of taking calibration images with the photographed photographic device-to-be-calibrated 19, the photographed calibration images are stored in the first image-acquiring section 60 or second image-acquiring section 62 (S218). The calibration images may be stored in an electromagnetic memory medium, for example, or may be transferred as image data to a calibrating apparatus via Internet. When the step S218 has been completed, the process is returned.

The image of the calibration field obtained in a way as described, is used for comparatively calculating the measured three-dimensional position of the developed binary image and the three-dimensional coordinates of the reference marks 112, 114 for wide-angle and the reference marks 122, 124 for zooming to analytically obtain internal parameters (a principal point position, screen distance and distortion parameter) of the camera every focal length of the zoom lens. The background area, excluding the reference marks of the three-dimensional field for calibration 100, is brought to an evenly shaded area of the image. Accordingly, in a calibration work as a post-process using the image of the calibration field, both the reference marks 112, 122 for wide-angle and the reference marks 122, 124 for zooming can be exactly detected. For example, the experiment performed by the inventors shows that the detection accuracy of a median point of the reference mark (target) is approximately 1/10 in the binary image, while that in the image on which a wall surface in the background was projected is approximately 1/4, that is, degraded about two to three times of the former.

Although, in the embodiment described above, both the reference marks for wide-angle and the reference marks for zooming are commonly fixed on the wall surface, the three-dimensional field for calibration as an area where the reference marks for calibration are positioned is not limited to it. For example, the reference marks for wide-angle are fixed to a wall surface, the reference marks for zooming may be fixed to a movable panel so that the reference marks for zooming is moved and positioned relative to the wall surface for positioning the reference marks for wide-angle and the reference marks for zooming.

Figure 8:
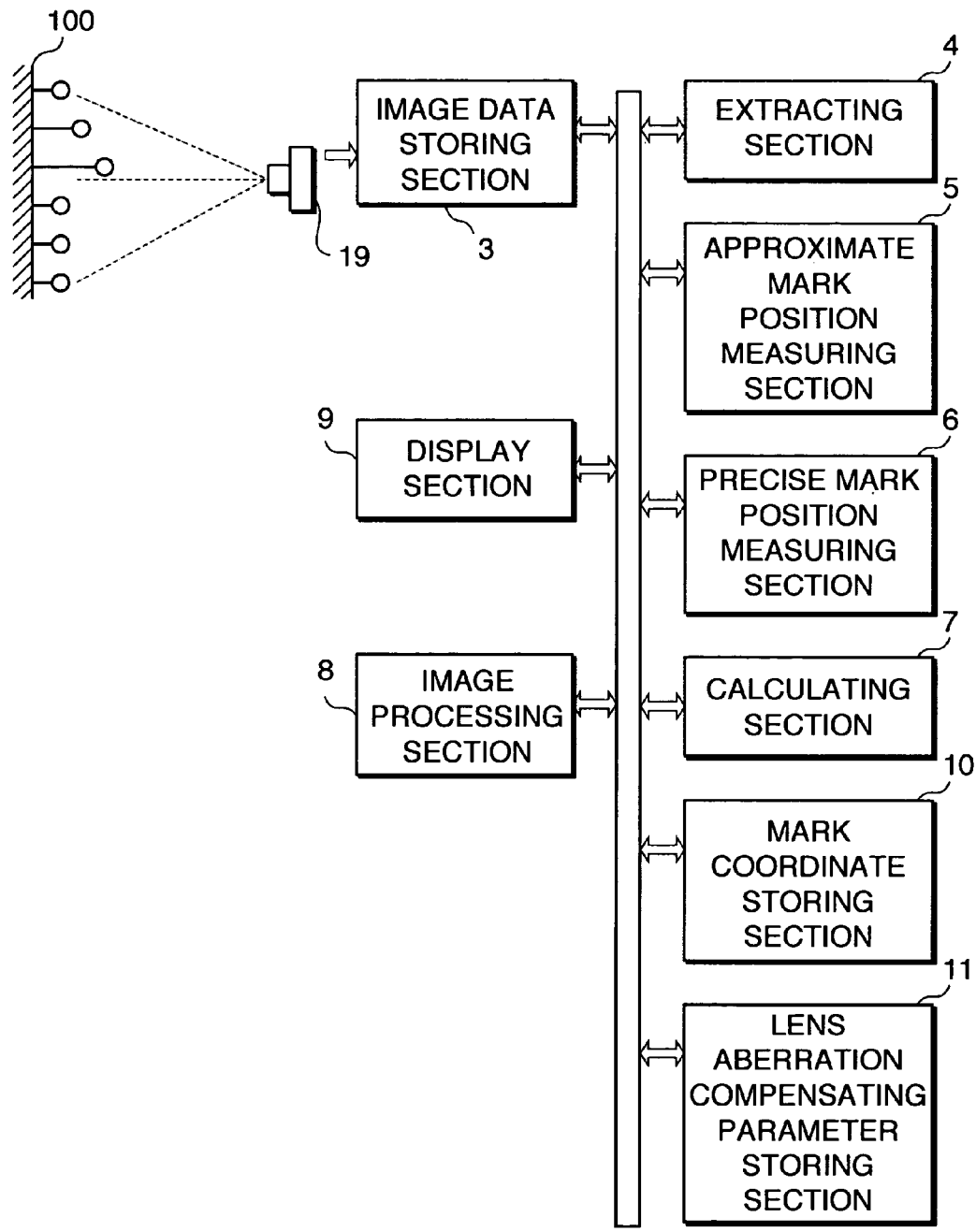
FIG. 8 is an overall block diagram, illustrating a calibrating apparatus to which this invention is applied.

FIG. 8 is an overall block diagram, illustrating a calibrating apparatus to which this invention is applied. A three-dimensional field 100 for calibration has reference marks for both wide-angle and zooming as shown in FIG. 3 to FIG. 6, for example. A photographic device-to-be-calibrated 19 is, as has been described, typically a camera with a zoom lens to be calibrated.

An image data storing section 3 corresponds to the first and second image-acquiring sections 60, 62 which uses herein a memory, for example a electromagnetic storing medium, such as a magnetic disk and a CD-ROM, for storing the calibration image data from the photographic device-to-be-calibrated 19. It is preferred that the calibration images stored in the first and second image-acquiring sections 60, 62 are stored in a mode allowing to determine the focal length in photographing. The calibration image data correspond to the first and second images for calibration.

The calibrating apparatus has an extracting section 4, an approximate mark position measuring section 5, a precise mark position measuring section 6, an calculating section 7, an image processing section 8, a mark coordinate storing section 10, and a lens aberration compensating parameter storing section 11, and also has an image data storing section 3 and a display section 9 as external devices. In the calibrating apparatus, a computer mounting a Pentium (trademark) or Celeron (trademark) produced by Intel Corporation as a CPU may be used. The correction coefficient calculating section 64 can be realized with the functions of the extracting section 4, the approximate mark position measuring section 5, the precise mark position measuring section 6, the calculating section 7 and the image processing section 8. Further, the extracting section 4 and the approximate mark position measuring section 5 uses a function as the reference mark inferring section 66 for rapidly detecting, with the use of the focal length information of the photographic device-to-be-calibrated 19, the positions of the reference marks in the three-dimensional field 100 for calibration.

The extracting section 4 perform a first mark extracting operation to extract the first marks from the image data stored in the image data storing section 3 and obtain the image coordinate values of the first marks. In the reference mark inferring section 66, with the use of the reference mark position information on the three-dimensional field 100 for calibration which was acquired at the previous focal length, the positional relation of the reference marks projected in the second image-for-calibration at the present focal length is inferred. The first mark extracting operation as a pre-process prior to calculating and correlating the approximate positions of the second marks is performed by the approximate mark position measuring section 5. The image coordinate values of the first marks are stored in the mark coordinate storing section 10. The term first mark herein means rough alignment reference mark 112 for wide-angle and rough alignment reference mark 122 for zooming. The term second mark herein also means precise alignment reference mark 114 for wide-angle and precise alignment reference mark 124 for zooming. The operation of extracting the first marks by the extracting section 4 will be described late in detail.

The approximate mark position measuring section 5 performs projection conversion to obtain exterior orientation element from the image coordinate values of the first marks extracted in the extracting section 4, and calculates the approximate positions of the second marks using the single-photograph orientation theorem and a collinearity condition expression to correlate a pair of images for calibration. In the process of calculating the approximate positions of the second marks, the second marks are efficiently extracted for each focal length by the approximate mark position measuring section 5 using the reference mark inferring section 66.

The precise mark position measuring section 6 recognizes the second marks on the paired images for calibration and calculates the positions of the second marks precisely. When there are second marks whose positions are calculated by the precise mark position measuring section 6 are significantly contradicts the positions of other second marks in the image data of the three-dimensional field 100 for calibration, the calculating section 7 removes the positions of such second marks. The calculating section 7 extracts a second mark suitable for calibration from the second marks the precise positions of which has been calculated in the precise mark position measuring section 6 and adjusts the exterior orientation elements and the objective coordinates thereof simultaneously, and calculates the internal parameters of the photographic device-to-be-calibrated 19. It is preferred that the lens aberration compensating parameter storing section 11 stores the calculated internal parameters of the photographic device-to-be-calibrated 19. The internal parameters of the photographic device-to-be-calibrated 19 are the principle point position, the screen distance and the distortion parameters. Although only distortion parameters are herein obtained, the spherical aberration, coma, astigmatism and curvature of field comprising Seidel's five aberrations may be obtained. The internal parameters obtained in the calculating section 7 are displayed on the display section in graphical form.

The image processing section 8 rearranges the data of an image photographed with the photographic device-to-be-calibrated 19 (especially, an image of other than the three-dimensional field 100 for calibration) using the internal parameters calculated in the calculating section 7. Then, the image photographed with the photographic device-to-be-calibrated 19 is displayed on the display section 9 as a low distortion image almost free from lens aberration. The display section 9 is an image display device such as a CRT or a liquid crystal display.

In the mark coordinate storing section 10 are stored the image coordinate values of the first marks in the calibration image taken for each focal length and also stored the image coordinate values of the second marks. It is preferred that the mark coordinate storing section 10 also stores the three-dimensional position information of the reference marks in the three-dimensional field 100 for calibration, which information has been stored in the reference mark position information database section 65 described above. In the lens aberration compensating parameter storing section 11 are stored, together with the focal lengths of the photographic device-to-be-calibrated 19, the calibration correction coefficient as an internal parameter of the photographic device-to-be-calibrated 19 which was calculated by the calculating section 7.

Figure 9:
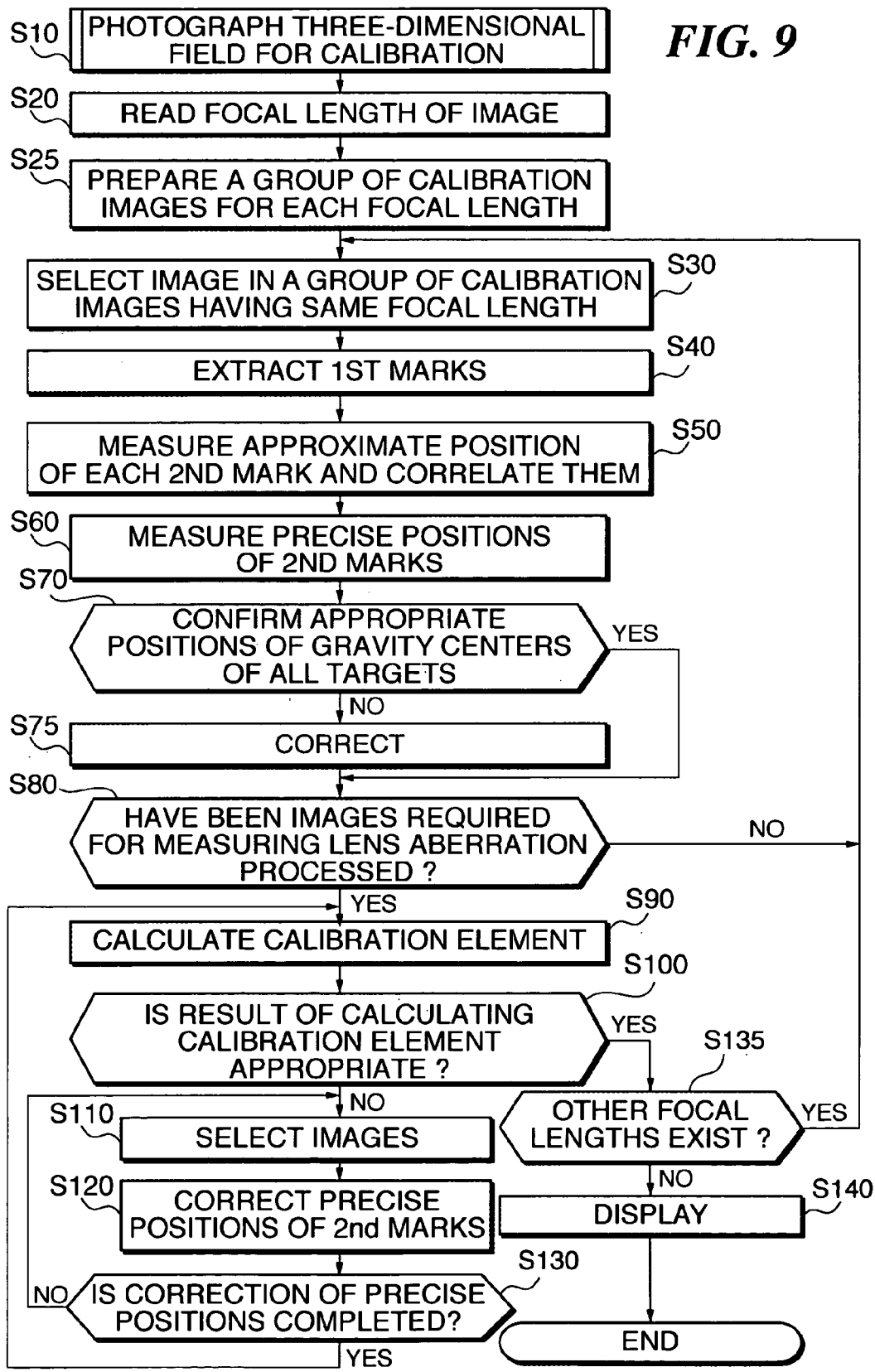
FIG. 9 is a flowchart for explaining the overall calibrating operation.

Referring to FIG. 9, description will be made of the overall flow of a calibration process using a calibrating apparatus of the present invention. FIG. 9 is a flowchart for explaining the overall calibrating process. First, the focal length of the photographic device-to-be-calibrated 19, the lens aberration of which will be compensated, is set to a predetermined value and the three-dimensional field 100 for calibration is then photographed (S10). These steps are described in detail in steps S202 to S214 in the flow chart of FIG. 7, for example.

Subsequently, the position of each focal length which is recorded on the calibration image stored in the image data storing section 3 (S20) is read. Then, for the calibration image, a group of calibration images for each focal length is prepared as a group of images having the same focal length of the photographic device-to-be-calibrated 19 (S25).

An image to be processed at present is then selected from the group of calibrating images which was prepared for each focal length (S30). That is, the calibrating apparatus reads the image data in the selected group of calibration images from the image data storing section 3 and displays the read image data on the display section 9. Then, the operator selects images on which correlating and measurement of targets are performed from the images displayed on the display section 9. Then, the extracting section 4 extracts the first marks from the selected images (S40)

(I): First Mark Extraction Process

In the first mark extraction process, in order to determine second-order equations for projection conversion of both the three-dimensional field 100 for calibration and the plane coordinates thereof into image coordinates (camera side), the positions of at least three first marks out of the first marks on the plain coordinate system are measured on the image data. Here, since the first marks include the second marks therein, the positions of the first marks can be designated precisely by designating the positions of the second marks included in the first marks. In the first mark extraction process, the steps I-(1) to I-(4) are repeated for all the first marks. That is, in the reference marks for wide-angle and the reference marks for zooming, as shown in FIG. 3 and FIG. 4, there are provided the precise alignment reference marks 114 for wide-angle within the area of the rough alignment reference marks 112 for wide-angle, and also provided the precise alignment reference marks 124 for zooming within the area of the rough alignment reference marks 122 for zooming.

I-(1): The operator points the cursor of the mouse to the second mark in the first mark to be detected on the entire image displayed on the display section 9 and clicks the mouse thereon to obtain the approximate position of the first mark.

I-(2): The operator designates an area including the coordinates of the first mark obtained in step I-(1) and the second marks around it from an enlarged view and displays it. At this time, the image including the second marks can be used as a template in measuring the precise positions of the second marks.

I-(3): The operator points the cursor to the gravity center of the second mark on the enlarged image displayed in the step I-(2) and clicks the mouse thereon to make the coordinates the position of the gravity center of the first mark. The positioning in step I-(3) may not be precise because correlating the approximate positions will be performed in a later process.

I-(4): The operator inputs the management number of the second mark corresponding to the position of the gravity center of the first mark measured in step I-(3) to correlate it to the management number of the second mark stored in the mark coordinate storing section 10. At this time, the position of the gravity center of the first mark measured in step I-(3) is attached to the management number of the second mark as reference coordinates.

In the first mark extraction process, when the order of measuring the first marks, for example, on the three-dimensional field 100 for calibration are determined in advance, the numbering process can be automatically performed on the extracting section 4 side even if the operator does not input the management number of the second mark. In the first marks extraction process, for example, the selected image displayed on the display section 9 may be divided into two sections: the entire image, as shown in FIG. 3 and FIG. 4, in one half of the screen and the enlarged image of a single rough alignment reference mark 112 for wide angle or a single rough alignment reference mark 122 for zooming in the other half of the screen may facilitate the position measurement work.

The first mark extraction process may be performed using only an entire image as shown in FIG. 3 and FIG. 4 without use of an enlarged image. In this case, the step I-(1) is performed and then the process performed in step I-(4) in the above process, namely the input of the management number of the second mark corresponding to the position of the gravity center of the first mark measured in step I-(1) is performed. The steps I-(2) and I-(3) can be therefore omitted because no enlarged image is used. However, since the entire image of the chart is displayed, the first marks are displayed in small sizes. The operator may decide whether to use an enlarged image or not on its preference.

Description will be made of the case where the first mark extraction process is automatically performed by the extracting section 4. At first, the external portion of the first mark excluding the second mark is registered as a template. The external portion of the first mark processed first in the first mark extraction process is registered as a template image. Then, the other first marks can be automatically measured by template matching. Also, the correlating of the first marks can be performed with ease since the positions of the first marks are apparent on the image. For example, when the first marks are arranged as shown in FIG. 3 and FIG. 4, it is easy to correlate each first mark based on the detected coordinates thereof. The template matching is the same as the target recognizing process (S62) in measurement of precise positions of the second marks and thus is not described here.

Description will be made of the case where the first mark extraction process is performed more automatically by the extracting section 4. A template image of the first mark for use in the first mark extraction process is registered in the extracting section 4 in advance. Then, the first marks are individually extracted by template matching using the template image of the first mark. Thus, the work of designating the first mark in step I-(1) can be omitted. Namely, when the first marks are apparently different from the second marks, the process can be automated by registering a temporal template image in the extracting section 4.

Then, the approximate mark position calculating section 5 measures and correlates the positions of the second marks (S50) This step include a step of obtaining exterior orientation elements (II-1) and step of calculating the approximate positions of the second marks (II-2). The term second mark means, as described above, the precise alignment reference mark 114 for wide-angle and the precise alignment reference mark 124 for zooming.

(II-1): Step of Obtaining Exterior Orientation Elements

The approximate mark position measuring section 5 substitutes the image coordinates of the first marks obtained in step S40 and the reference point coordinates corresponding thereto into the second-order equations (2) for projection conversion to set up an observation equation for obtaining parameters b1 to b8:

$$X=(b1 \cdot x+b2 \cdot y+b3)/(b7 \cdot x+b8 \cdot y+1)$$

$$Y=(b4 \cdot x+b5 \cdot y+b6)/(b7 \cdot x+b8 \cdot y+1) \qquad (2)$$

wherein X and Y represent the reference point coordinates and x and y represents the image coordinates.

Figure 11:
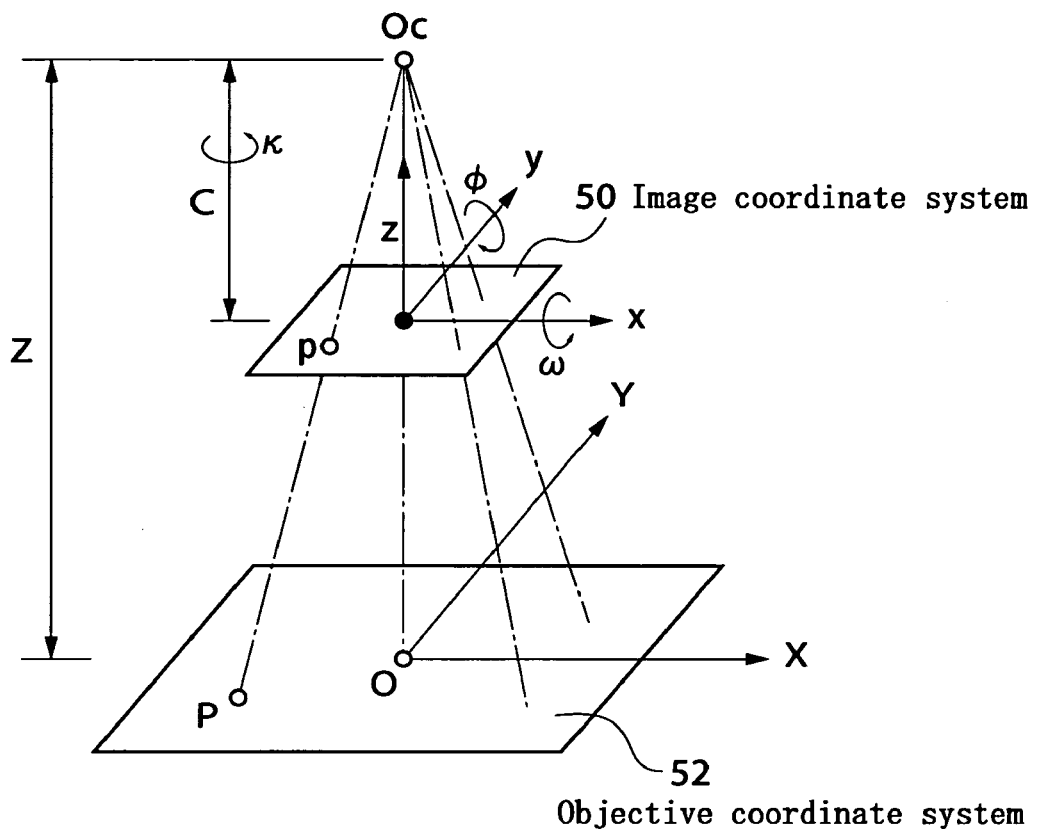
FIG. 11A is an explanatory view of an image coordinate system and an objective coordinate system in center projection and FIG. 11B is an explanatory view of a template image for normalized correlation and an object image for use in the target recognition.
Figure 11:
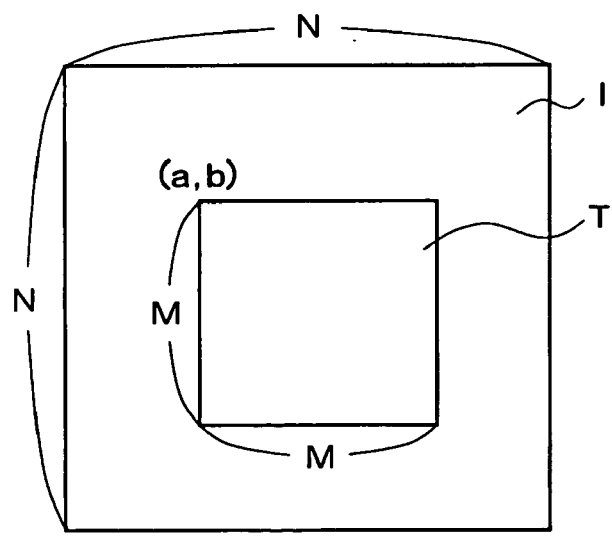

The relation between the reference point coordinates and the image coordinates will be described. FIG. 11A is an explanatory view of an image coordinate system and an objective coordinate system in center projection. In center projection, a objective coordinate system 52 as a reference point coordinate system on which the three-dimensional field 100 for calibration is located and an image coordinate system 50 on which the film in the photographic device-to-be-calibrated 19 or a CCD is located are in the positional relation as shown in FIG. 11A with respect to the project center Oc. Here, (X, Y, Z) is the coordinates of an object such as a reference mark on the objective coordinate system 52, (X0, Y0, Z0) are the coordinates of the projection center Oc, (x, y) are the coordinates of a point on the image coordinate system 50, C is the screen distance from the projection center Oc to the image coordinate system 50, and ω, φ and κ are the inclinations of the image coordinate system 50 in photographing with respect to the three axes X, Y and Z, respectively, forming the objective coordinate system 52 and referred to as exterior orientation element.

Then, using the parameters b1 to b8 in the equation (2), the following exterior orientation elements are obtained by the equations (3):

$$\omega=\tan^{-1}(C \cdot b8)$$

$$\phi=\tan^{-1}(-C \cdot b7 \cdot \cos \omega)$$

$$\kappa=\tan^{-1}(-b4/b1) \quad (\phi=0)$$

$$\kappa=\tan^{-1}(-b2/b5) \quad (\phi \neq 0, \omega=0)$$

$$\kappa=\tan^{-1}\{-(A1 \cdot A3-A2 \cdot A4)/(A1 \cdot A2-A3 \cdot A4)\} \quad (\phi \neq 0, \omega \neq 0)$$

$$Z0=C \cdot \cos \omega \cdot \{(A22+A32)/(A12+A42)\}^{1/2}+Zm$$

$$X0=b3-(\tan \omega \cdot \sin \kappa/\cos \phi - \tan \phi \cdot \cos \kappa) \times (Zm-Z0)$$

$$Y0=b6-(\tan \omega \cdot \cos \kappa/\cos \phi - \tan \phi \cdot \sin \kappa) \times (Zm-Z0) \qquad (3)$$

Wherein, $A1=1+\tan^2 \phi$, $A2=B1+B2 \cdot \tan \phi/\sin \omega$, $A3=B4+B5 \cdot \tan \phi/\sin \omega$, $A4=\tan \phi/(\cos \phi \cdot \tan \omega)$, Zm is the average of the heights of the first marks. For example, when the rough alignment reference marks 112 for wide-angle are used, Zm is the average of seven points shown in FIG. 3. When the rough alignment reference marks 122 for zooming are used, Zm is the average of seven points shown in FIG. 4. C is the focal length and corresponds to the screen distance as described.

(II-2): Step of Calculating Approximate Position of Second Marks

A camera coordinate (xp, yp, zp) on an inclined camera coordinate system represented by the image coordinate system 50 corresponding to the coordinates (X, Y, Z) of an object on the ground represented by the objective coordinate system 52 are given by the equation (4) based on the principle of single photograph orientation:

$$\begin{pmatrix} x_p \\ y_p \\ z_p \end{pmatrix} = \begin{pmatrix} 1 & 0 & 0 \\ 0 & \cos\omega & -\sin\omega \\ 0 & \sin\omega & \cos\omega \end{pmatrix} \qquad (4)$$

$$\begin{pmatrix} \cos\phi & 0 & \sin\phi \\ 0 & 1 & 0 \\ -\sin\phi & 0 & \cos\phi \end{pmatrix} \begin{pmatrix} \cos\kappa & -\sin\kappa & 0 \\ \sin\kappa & \cos\kappa & 0 \\ 0 & 0 & 1 \end{pmatrix} \begin{pmatrix} X-X_0 \\ Y-Y_0 \\ Z-Z_0 \end{pmatrix}$$

$$= \begin{pmatrix} a_{11} & a_{12} & a_{13} \\ a_{21} & a_{22} & a_{23} \\ a_{31} & a_{32} & a_{33} \end{pmatrix} \begin{pmatrix} X-X_0 \\ Y-Y_0 \\ Z-Z_0 \end{pmatrix}$$

wherein, (X0, Y0, Z0) are the ground coordinates of the projection center Oc as shown in FIG. 11(A).

Then, the inclinations (ω, φ, κ) obtained using the equations (3) are substituted into the equation (4) and a rotation matrix calculation is performed to obtain rotation matrix elements a11 to a33.

The thus obtained rotation matrix elements a11 to a33, the coordinates of the position of the camera (X0, Y0, Z0) obtained using the equations (3) and the reference point coordinates (X, Y, Z) of a target are substituted into the equation of collinearity condition (5) to obtain he image coordinates (x, y) of the target. The equation of collinearity condition is a relationship equation which holds when the projection center, a photographed image and an object on the ground are on one line. Thereby, the positions of the second marks without lens aberration are calculated. Thus, the approximate image coordinates of the target in an image photographed with the device-to-be-calibrated 19 with lens aberration can be obtained:

$$x=-C \cdot \{a11(X-X0)+a12(X-X0)+a13(Z-Z0)\}/\{a31(X-X0)+a32(X-X0)+a33(Z-Z-0)\}$$

$$y=-C \cdot \{a21(X-X0)+a22(X-X0)+a23(Z-Z0)\}/\{a31(X-X0)+a32(X-X0)+a33(Z-Z-0)\} \quad (5)$$

In the calculation of tan<−1> in the equations (3), two solutions are obtained. Thus, each of the inclinations (ω, φ, κ) has two solutions. Here, all the solutions are calculated and correct ω, φ and κ are calculated by comparing the residuals between the image coordinates of the first marks measured in the first mark extraction process and the image coordinates of the corresponding points obtained using the equations (5).

Although second order equations for projection conversion are used, the invention is not limited thereto. Other equations for projection conversion such as third order equations for projection may be used. The approximate mark position measuring section 5 correlates the second marks by assigning the management numbers of the second marks attached to a reference point file stored in the mark coordinate storing section 10 or the like to the target (second mark) of each of the first marks.

Figure 10:
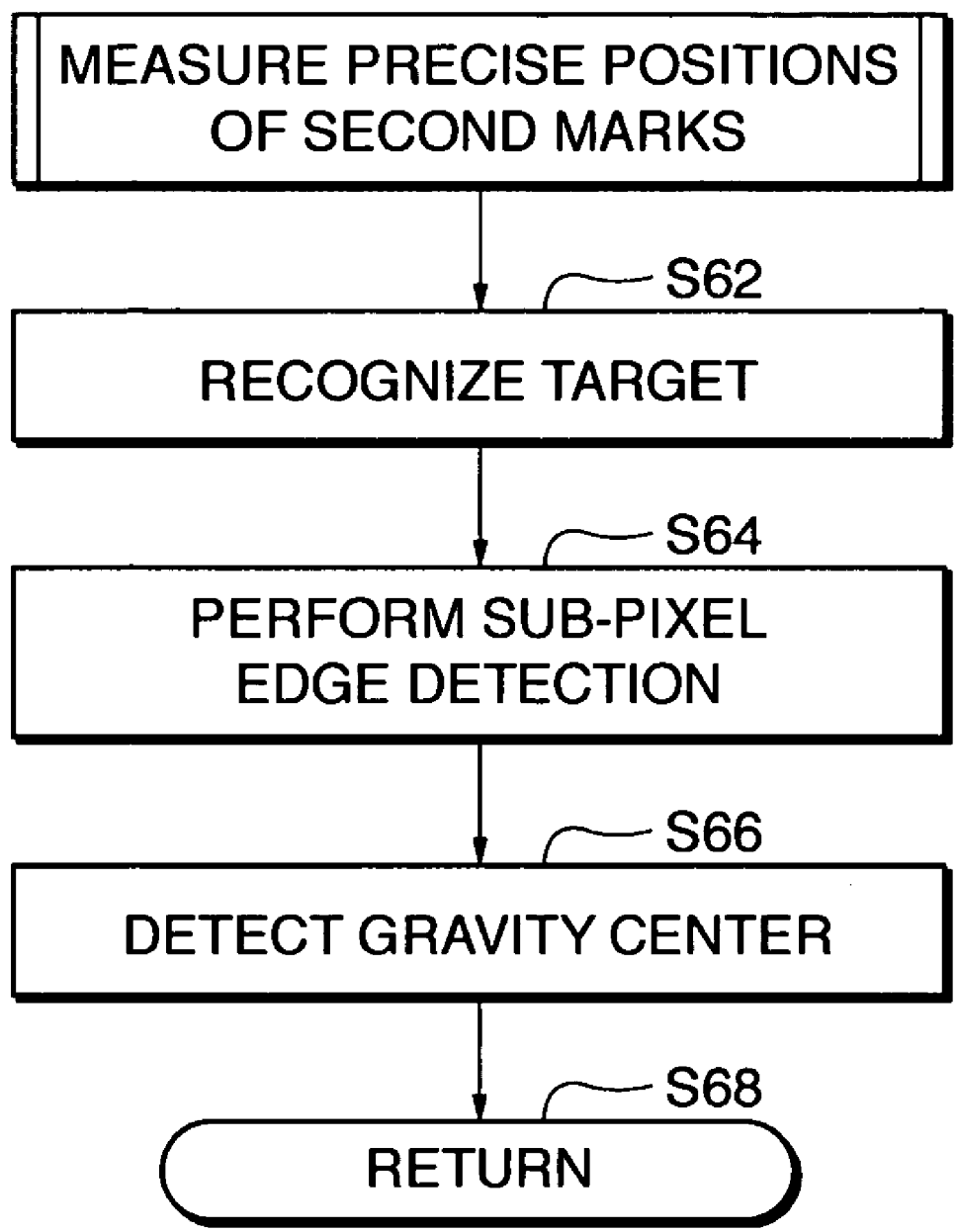
FIG. 10 is a flow chart, illustrating precise position measuring of second marks in step S60.

Description will be made with reference again to FIG. 9. The precise mark position measuring section 6 measures the precise positions of the second marks (S60). The procedure for measuring the precise positions of the second marks will be described in detail with reference to FIG. 10. The precise mark position measuring section 6 recognized the targets as second marks (S62). Template matching using normalized correlation, for example, is used for the target recognition. The targets recognition will be described in detail.

(III) Target Recognition

FIG. 11B is an explanatory view of a template image for normalized correlation and an object image for use in the target recognition. At first, an arbitrary target is selected from the gravity measured in the first mark extracting step (S40). The template image for normalized correlation is an M*M pixel image centered around the gravity center (image coordinates) of the target. The object image is an N*N pixel image centered around the approximate position (image coordinates) of the target calculated in the step of measuring the approximate positions of the second marks (S50).

Then, template matching according to the normalized correlation expressed by the equation (6) is performed on the object image and the point where the correlation value is maximum is obtained. Superposition is accomplished at the point where the correlation value is maximum and the target is regarded as being recognized at the point. The coordinates of the center of the template image are converted into image coordinates on a same-scale image, which are determined as a detecting point:

$$A=\{M^2 \times \Sigma(Xi \times Ti)-\Sigma Xi \times \Sigma Ti\}/[\{M^2 \times \Sigma Xi^2-(\Sigma Xi)^2\} \times \{M^2 \times \Sigma Ti^2-(\Sigma Ti)^2\}] \quad (6)$$

wherein, A represents the correlation value, M represents the side size of the template image, Xi represents the object image and Ti represents the template image. The side sizes N and M are variable but preferably as small as possible to shorten the processing time based on the premise that the target can be sufficiently included in the images.

Figure 12:
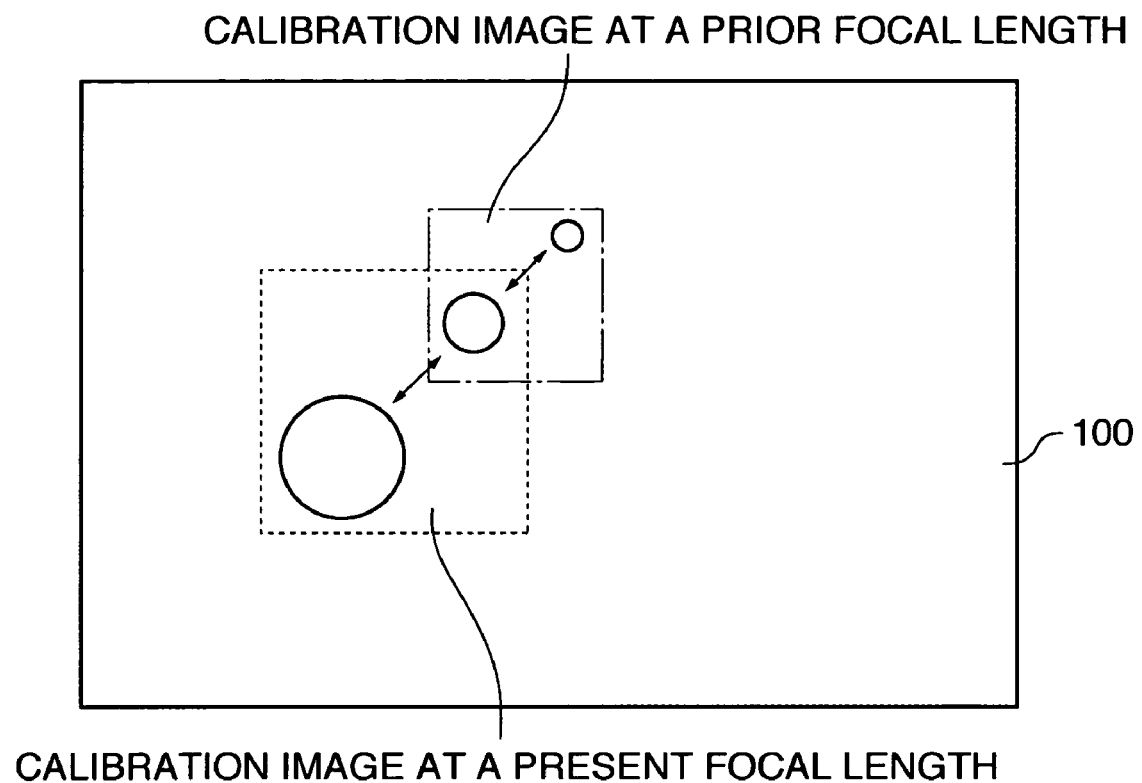
FIG. 12 is a view, illustrating the relation between target recognition and the template images when the focal length of the photographic device-to-be-calibrated is adjusted

The first mark extraction process and the approximate position calculating process for the second marks with the use of the reference mark inferring section 66 will be described in detail. FIG. 12 is a view, illustrating the relation between target recognition and the template images when the focal length of the photographic device-to-be-calibrated is adjusted, in which each photographed area of a calibration image at a prior focal length and a calibration image at a present focal length is shown in the three-dimensional field 100 for calibration. When the focal length of the photographic device-to-be-calibrated 19 is changed in sequence, both the target position and target size of the calibration image at the present focal length can be inferred using the target position information of the calibration image at the prior focal length. Here, the term target means a rough alignment reference mark 112 for wide-angle as a first mark and a precise alignment reference mark 114 for wide-angle as a second mark, or a rough alignment reference mark 122 for zooming as a first mark and a precise alignment reference mark 124 for wide-angle as a second mark. In such constitution, for the first marks, the extracting section 4 extracts the coordinate values of the first marks, while for the second marks the approximate mark position measuring section 5 calculates the approximate positions of the second marks. During operation, the extraction of the target positions is accelerated by the reference mark inferring section 66.

The duplicate reference extracting section 67 extracts a group of the reference marks matched between the photographed reference marks for calibration in the first image-for-calibration as a calibration image at a prior focal length and the photographed reference marks for calibration in the second image-for-calibration as a calibration image at a present focal length. Then the additional reference mark position information extracting section 68 extracts, from the reference mark image in the second image-for-calibration, additional reference marks with which any reference marks in the first image-for-calibration do not match, and reads the three-dimensional position information relating to the additional reference marks with reference to the reference mark position information database section 65.

Figures 13A, 13B:
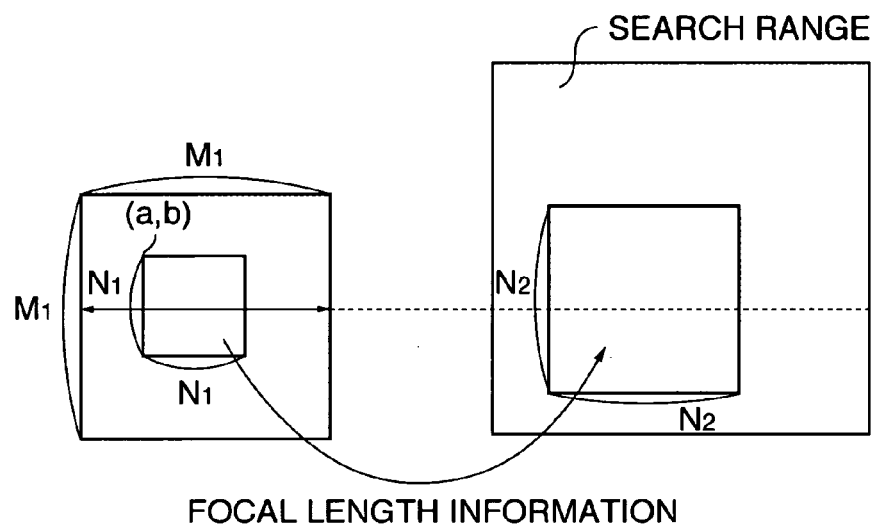
FIGS. 13A and 13B illustrate an example of extraction of a duplicate reference mark with the use of cross correlation coefficient method.

FIG. 13 illustrates an example of extraction of a duplicate reference mark with the use of cross correlation coefficient method, FIG. 13(A) shows a calibration image at a prior focal length, and FIG. 13(B) a calibration image at a present focal length. The correlation coefficient method is performed according to the following procedure using an expression as follows:

$$C(a,b) = \sum_{m_1=0}^{N_1-1} \sum_{n_1=0}^{N_1-1} \frac{\{I_{(a,b)}(m_1,n_1) - \bar{I}\}\{T(m_1,n_1) - \bar{T}\}}{\sqrt{I_{\sigma_{ab}} T_\sigma}} \quad (7)$$

$$\bar{I} = \frac{1}{N_1^2} \sum_{m_1=0}^{N_1-1} \sum_{n_1=0}^{N_1-1} I_{(a,b)}(m_1,n_1) \quad (8)$$

$$\bar{T} = \frac{1}{N_1^2} \sum_{m_1=0}^{N_1-1} \sum_{n_1=0}^{N_1-1} T(m_1,n_1) \quad (9)$$

$$I_{\sigma_{ab}} = \frac{1}{N_1^2} \sum_{m_1=0}^{N_1-1} \sum_{n_1=0}^{N_1-1} \{I_{(a,b)}(m_1,n_1) - \bar{I}\}^2 \quad (10)$$

$$T_\sigma = \frac{1}{N_1^2} \sum_{m_1=0}^{N_1-1} \sum_{n_1=0}^{N_1-1} \{T(m_1,n_1) - \bar{T}\}^2 \quad (11)$$

$I_{(a,b)}(m_1,n_1)$: Part of input image $T(m_1,n_1)$: Template image

III-1: For example, an N1*N1 pixel image centered around the point of a reference mark extracted by the duplicate reference mark extracting section 67 is carved as a template image from a calibration image at a prior focal length. The template image is converted into an N2*N2 pixel image in view of the prior and present focal lengths. FIG. 13(B) shows an example of a carved template image and a converted template image thereof.

III-2: M1*M1 pixels larger than the template image and included in the calibration image at the present focal length is defined as a search range $(M1+N1-1)^2$ and then the template image is moved within the search range.

III-3: The search is presumed to be completed relative to the template image at the time an image position where the cross correlation coefficient C (a, b) in the above expression reaches maximum value is obtained. If the calibration image at the prior focal length matches completely the calibration image at the present focal length, the cross correlation coefficient C (a, b) equals 1.0.

III-4: If any reference marks that were not projected in the calibration image at the prior focal length exist in the calibration image at the present focal length, then the additional reference mark position information extracting section 68 performs subsequent process.

Description will be made with reference again to FIG. 10. Sub-pixel edge detection is performed on the second marks (S64). The object image on which the sub-pixel edge detection of the second marks is performed is an N*N pixel image centered around the detecting point recognized as a target in step S62. Laplacian-Gaussian filter (LOG filter) as a quadratic differential of a Gauss function expressed by the equation (12) is applied to the brightness waveform in the object image and the two zero crossing points on a curve as a result of calculation, namely the edges, will be detected with sub-pixel accuracy. To detect with sub-pixel accuracy means to perform position detection with higher accuracy than one pixel.

$$\nabla^2 \cdot G(x) = \{(x^2 - 2\sigma^2)/2\pi\sigma^6\} \cdot \exp(-x^2/2\sigma^2) \quad (12)$$

wherein, $\sigma$ represents the parameter of the Gauss function.

Then, the gravity center of the target is detected (S66), and the process is returned (S68). Here, the position where of the cross point of edges in the x and y directions cross each other obtained using the equation (12) is determined as the position of the gravity center of the target. The measurement of the precise positions of the second marks is not necessarily performed by the process comprising steps S62 to S66. The precise positions of the second marks may be obtained by another gravity center position detection method such as a moment method or a modified template matching method.

Description will be made with reference again to FIG. 9. It is confirmed that there is no apparent error in the positions of the gravity centers of all the targets (S70). Namely, it is judged whether the position detection of the recognized targets was appropriate. For the convenience of the operator, the positions of the detected targets are displayed on the display section 9. When there is no error, the process goes to step S80. When there is error, inappropriate target positions are corrected (S75). Targets the correlation values of which calculated in step S62 are low or targets the detected gravity center positions of which are far apart from their approximately positions are displayed on the display section 9 in such a manner that the operator can easily recognize, in red, for example. The operator manually recalculates the positions of such targets (designates the gravity center positions thereof with the mouse). The erroneous target positions are not necessarily corrected here. They can be removed since they are detected as abnormal points in the process for obtaining calibration parameters in step S90.

The process comprising steps S30 to S75 are performed on for all the images necessary for the measurement of the lens aberration (S80). For example, when five images were photographed, the process may be performed on the five images. When sufficient number of images for the measurement of the lens aberration has been processed, the other photographed images may not be necessarily processed.

When a sufficient number of images for the measurement of the lens aberration have been processed, a process for obtaining calibration correction coefficient for the lens aberration using the process for calculating the internal parameter performed in the calculating section 7 is performed (S90). The calculation of calibration correction coefficient is performed on all the second marks which are present in the three-dimensional field 100 for calibration and have been correlated and whose gravity centers have been obtained by the processes in the approximate mark position measuring section 5 and the precise mark position measuring section 6.

(IV): Process for Calculating Internal Parameters of Camera (Bundle Adjustment with Self-Calibration)

For the process for calculating the internal parameters of the camera in the calculating section 7 is, "bundle adjustment with self-calibration" used in the field of photogrammetry is used. The "bundle adjustment" is a method in which an observation equation is set up for each of light bundles of each image based on the collinearity condition that light bundles connecting the object, lens and CCD surface should be on one line, and the position and the inclination of the camera (exterior orientation elements) and the coordinate positions of the second marks are simultaneously adjusted by a least square method. With the "bundle adjustment with self-calibration", the calibration elements, namely the inner orientations of the camera (lens aberration, principle point position and focal length) can be also obtained. The collinearity condition basic equations of bundle adjustment with self-calibration (which will be hereinafter referred to as "bundle adjustment") are the following equations (13) and (14):

$$x = -c \frac{a_{11}(X - X_0) + a_{12}(Y - Y_0) + a_{13}(Z - Z_0)}{a_{31}(X - X_0) + a_{32}(Y - Y_0) + a_{33}(Z - Z_0)} + \Delta x \quad (13)$$

$$y = -c \frac{a_{21}(X - X_0) + a_{22}(Y - Y_0) + a_{23}(Z - Z_0)}{a_{31}(X - X_0) + a_{32}(Y - Y_0) + a_{33}(Z - Z_0)} + \Delta y \quad (14)$$

The equations (13) and (14) are based on the equation of collinearity condition (5) for single-photograph orientation described in describing the first mark extraction process. Namely, the bundle adjustment is a method in which various solutions are obtained from a plurality of images by least square approximation, and by which the exterior orientation positions of the camera at different photographing positions can be obtained at the same time. Namely, the calibration elements of the camera can be obtained.

The following equation (15) is an example of a correction model for an inner orientation (lens aberration) applied to a lens with distortion in the radial direction:

$$\begin{cases} \Delta x = x_0 + x(k_1 r^2 + k_2 r^4) \\ \Delta y = y_0 + y(k_1 r^2 + k_2 r^4) \\ r^2 = (x^2 + y^2)/c^2 \end{cases} \quad (15)$$

$k_1, k_2$: Lens distortion in the radial direction

The correction model is not limited to the above one. A correction model suitable for the lens may be selected. The calculation can be made by a successive approximation method when there are at least six reference points on the ground coordinate system and the image coordinate system. The calculating section 7 has a threshold value of the successive approximation method and removes the second marks on the three-dimensional field 100 for calibration whose error is not smaller than the threshold value to obtain precise calibration correction coefficient. Thus, the second marks which were not detected as erroneous marks in the step of confirming the gravity centers of the targets (S70) can be detected and removed in step S90.

Description will be made with reference again to FIG. 9. The result of calculation for obtaining the calibration correction coefficients by the calculating section 7 is judged (S100). When the calculation did not converge or there are inappropriate calibration correction coefficient in the obtained calibration correction coefficient, the problems are solved in step S110. In step S110, images including erroneous second marks are selected. Since it has become apparent which second marks of which images have error by the calculating section 7 when the calibration in step S90 was completed, the detecting points of the targets are displayed for confirmation.

The operator manually corrects the erroneous second marks (S120). Namely, since the coordinates of the gravity center of the erroneous second marks are shifted, the correction is made by moving the mark displayed as erroneous second marks to the gravity center position displayed as being appropriate. Then, it is judged whether the correction of the positions of the erroneous second marks has been completed (S130). When the correction has been completed, the process returns to the step of calculating the calibration correction coefficient in step S90, and the calibration correction coefficient are calculated again. If there are other second marks to be corrected, the process returns to step S110 and the operation for correcting the positions of erroneous second marks is repeated.

When the result of operation for obtaining the calibration correction coefficient is appropriate, it is judged whether or not there exists any other group of calibration images which have an other focal length (S135). If exists, the process returns to S30. When the result of operation for obtaining the calibration coefficient for every focal length, those results are displayed in the display section 9 (S140).

Figure 14:
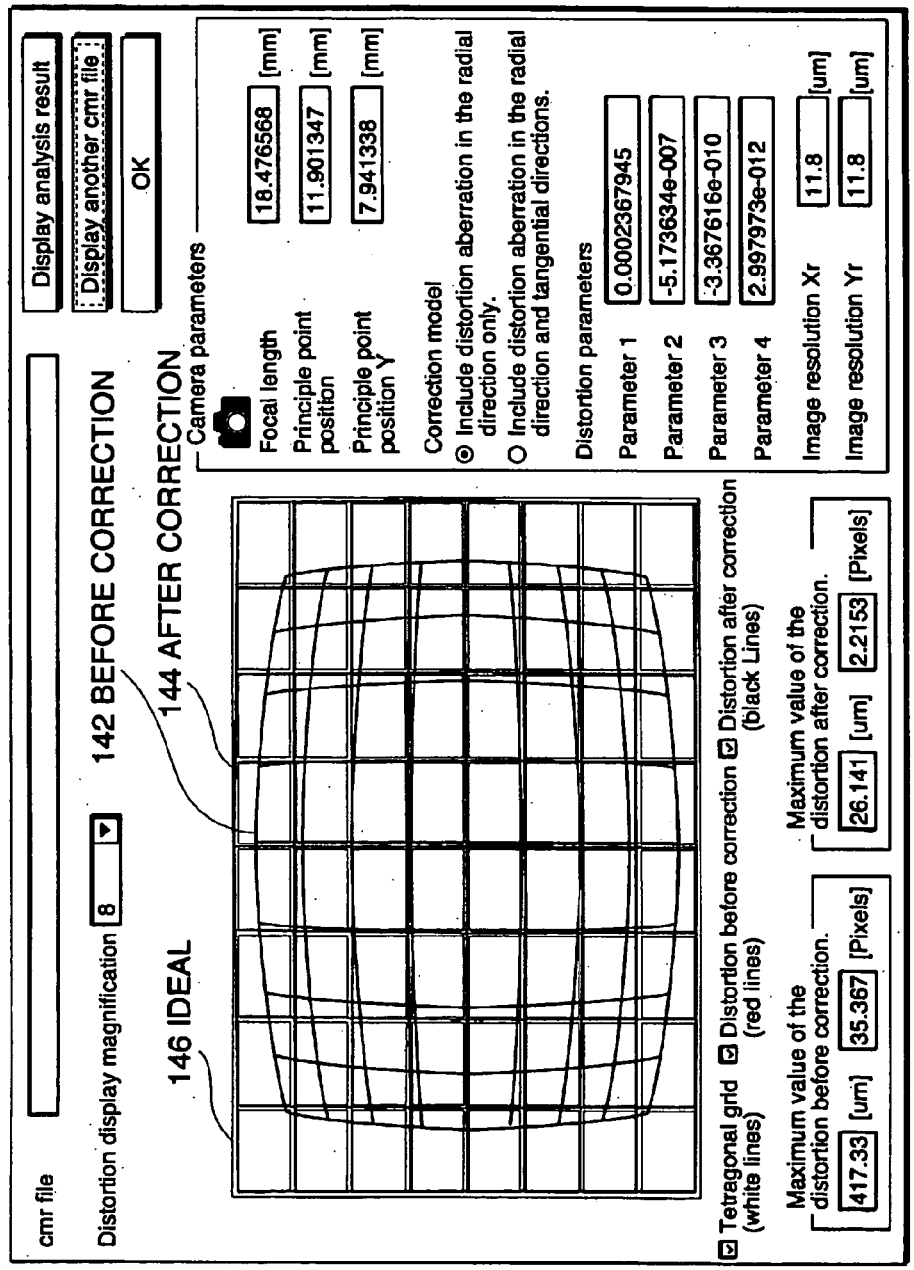
FIG. 14 is an explanatory view, showing an example of a result of calculating a calibration correction coefficient.

FIG. 14 is an explanatory view, showing an example of the result of the operation for obtaining the calibration correction coefficient. For example, the focal length, principle point position and distortion parameters as the calibration correction coefficient are displayed on the display section 9. As for distortion representing the lens aberration, curves 102 before correction, curves 104 after correction, and ideally corrected curves 106 may be displayed in graphical form for easy understanding.

Figure 15:
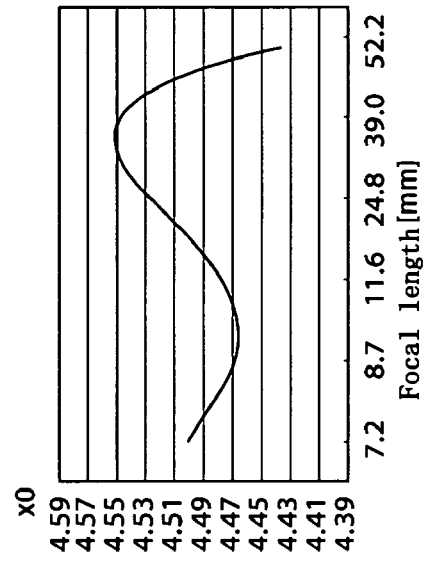
FIGS. 15(A)-15(D) illustrate a relationship between a focal length and a coefficient for use in internal parameters.
Figure 15:
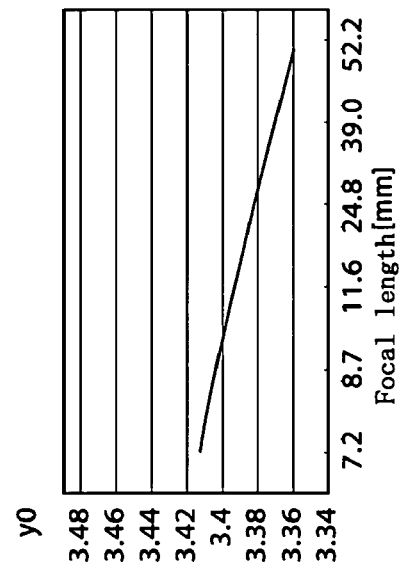
Figure 15:
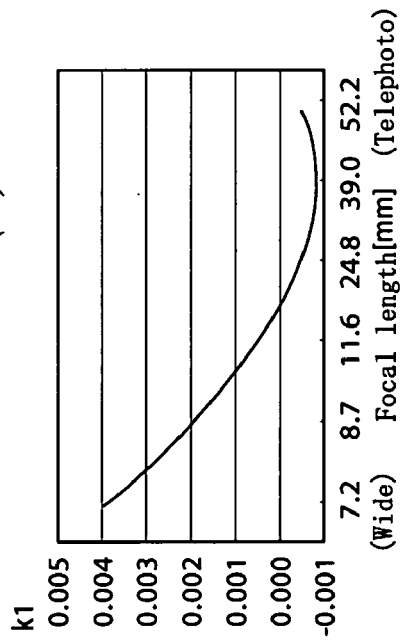
Figure 15:
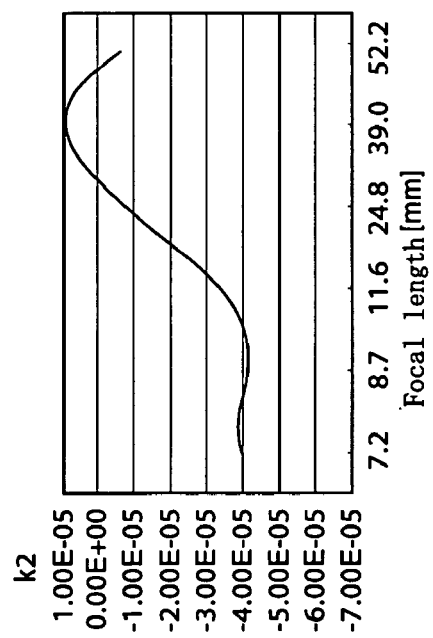

Next, there is a explanation of the calibration correction factor function which makes a focal length a variable using the internal parameter calculated in the calculating section 7. FIG. 15 is a view illustrating the relation between the focal length and the coefficients for use in the internal parameter functions. FIG. 15(A) shows the relation between the focal length and a coefficient k1 in the equation (15), FIG. 15(B) shows the relation between the focal length and a coefficient k2 in the equation (15), FIG. 15(C) shows the relation between the focal length and a coefficient $x_o$ of deviation in the x-axis direction of the principle point of the camera from the center of the image on an image coordinate system x, and FIG. 15(D) shows the relation between the focal length and a coefficient $y_o$ of deviation in the y-axis direction of the principle point of the camera from the center of the image on an image coordinate system y. As described before, the device-to-be-calibrated 19 in which the focal length can be adjusted from 7.2 mm to 50.8 mm is taken here as an example. When the focal length data are measured at six points, the measurement is performed at focal lengths of 7.2 mm (wide end) and 52.2 mm (telephoto end), and 8.7 mm, 11.6 mm, 24.8 mm, 39.0 mm are selected as the measuring point between them to perform measurement at equal intervals in an optical sense.

The coefficient k1 in the equation (15) is maximum at the wide end and small on the telephoto side. The coefficient $x_o$ varies in a complex manner; it takes the minimum value of 4.46 when the focal length of the device-to-be-calibrated 19 is 8.7 mm and 52.2 mm and the maximum value of 4.55 when the focal length of the camera 2 is 39.0 mm and thus is approximated with a curve of the fifth order. The coefficient $y_o$ varies monotonously with the focal length of the device-to-be-calibrated 19. The chart is photographed in focus, so that the focal length f of the device-to-be-calibrated 19 and the distance C from the projection center point Oc to the image coordinate system 50 are equal.

In the internal parameter function calculating part 160, when the focal length f is input, the coefficients k1, k2, $x_o$ and $y_o$ for use in the internal parameter functions are obtained. Then, the coefficients are substituted into the equations (13), (14) and (15) as the internal parameter functions to set up observation equations for each of the measuring points. Then, by solving the equations simultaneously and applying a least square method, the most provable internal parameters can be calculated.

In the above embodiment, description has been made of a case in which the function as the reference mark inferring section is stored in the extracting section or the approximate mark position measuring section. However, the invention is not limited thereto. For example, the function as the reference mark inferring section may be separately configured as a common function of the calibrating apparatus. There may be a variety of modified examples.

As described above, according to the calibrating apparatus the invention a calibration image for each focal length can be acquired by the first and second image acquiring sections even if the focal length is changed. Since the positional relation of the reference marks for calibration which were projected in the second image-for-calibration can be inferred by the reference mark inferring section with the use of positional information of the reference marks for calibration which were projected in the first image-for-calibration, it is easy for the correction coefficient calculating section to calculate the calibration correction coefficient for the second focal length.

A photographing apparatus can be constituted to have an image correction function of correcting an image with the use of a calibration correction coefficient corresponding to a focal length at which the image was actually photographed (including both the calibration correction coefficient for focal length calculated based on an image actually taken at which an image was photographed and the calibration correction coefficient for focal length calculated by the given calculation from the calibration correction coefficient at which the image is not photographed actually.).

Figure 16:
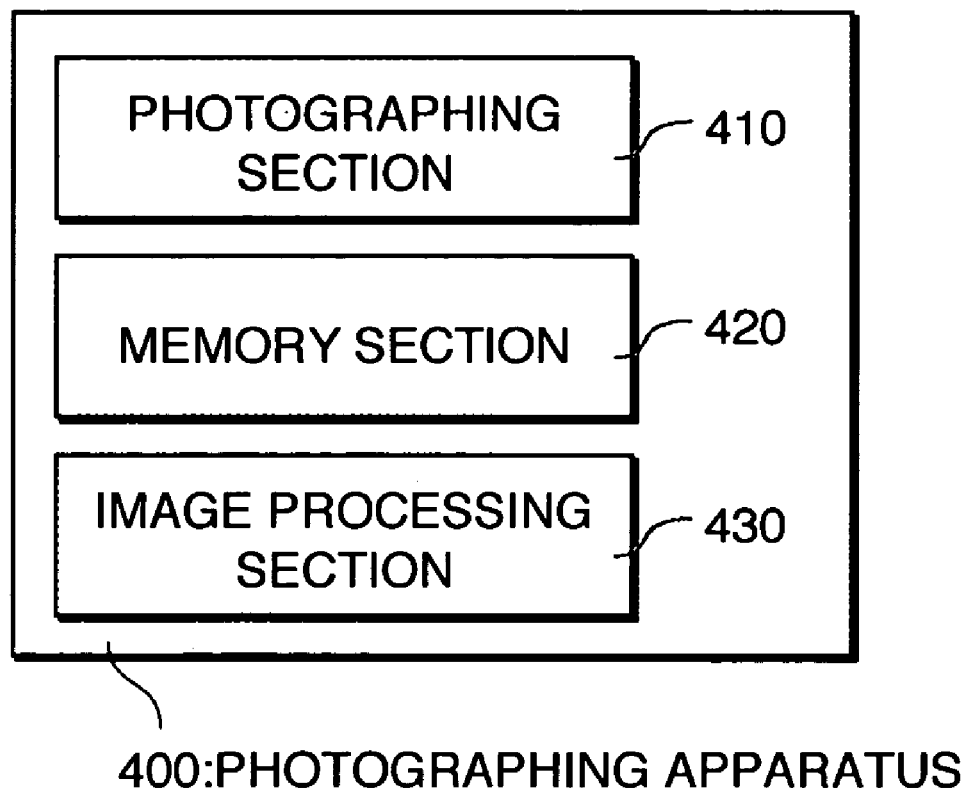
FIG. 16 is a block diagram of a photographing apparatus.

This photographing apparatus 400 includes, as shown in FIG. 16, a memory section 420 for storing a calibration correction coefficient for each focal length, a photographing section 410 capable of varying the focal length thereof, and an image processing section 430 for correcting the image photographed by the photographed section on the basis of the stored calibration correction coefficient corresponding to the focal length of the image taken by the photographing section.

In this embodiment, the calibration correction coefficient stored in the memory section 420 may be a calibration correction coefficient of an image actually taken at a focal length for calibration, or may be a calibration correction coefficient calculated in the process of the step S320, for a focal length other than those at which an image was photographed.

Further, the photographing apparatus may be constituted such that a calibration correction coefficient is calculated by the image processing section 430 in the process of the step S320, for a focal length other than those at which an image was photographed and then an image correction is performed with a calibration correction coefficient corresponding to a focal length at which an image was photographed.

What is claimed is:

1. A calibrating apparatus for a zoom lens, comprising:
   a first image-acquiring section for acquiring a first image-for-calibration by photographing an area, in which reference marks for calibration are positioned, with a photographic device-to-be-calibrated whose focal length is set to a first focal length;
   a second image-acquiring section for acquiring a second image-for-calibration by photographing the area, in which the reference marks for calibration are positioned, with the photographic device-to-be-calibrated whose focal length is set to a second focal length;
   a correction coefficient calculating section for calculating a calibration correction coefficient for the first and second focal lengths, with the use of the photographed reference marks in the first and second images-for-calibration; and
   a reference mark inferring section for inferring a positional relationship of the photographed reference marks for calibration in the second image-for-calibration, with the use of the photographed reference marks for calibration in the first image-for-calibration.

2. The calibrating apparatus for a zoom lens of claim 1, wherein the photographic device-to-be-calibrated photographs the area, in which the reference marks for calibration are positioned, for each of a series of sequential focal lengths including the first and second focal lengths.

3. The calibrating apparatus for a zoom lens of claim 1, further comprising a reference mark position information database section for storing three-dimensional position information of the reference marks in the area in which they are positioned, wherein the reference mark inferring section comprises:
   a duplicate reference mark extracting section for extracting a group of the reference marks matched between the photographed reference marks for calibration in the first image-for-calibration and the photographed reference marks for calibration in the second image-for-calibration; and
   an additional reference mark position information extracting section for extracting, from the reference mark image in the second image-for-calibration, additional reference marks which any reference marks in the first image-for-calibration do not match, and for reading the three-dimensional position information relating to the additional reference marks with reference to the reference mark position information database section.

4. The calibrating apparatus for a zoom lens of claim 1, wherein the reference mark inferring section infers the positional relationship in the photographed reference marks for calibration in the second image-for-calibration with the use of information on positions of the reference marks for calibration projected in the first image-for-calibration and also information on the first and second focal lengths.

5. A photographing apparatus for using the calibration correction coefficient obtained in claim 1, comprising:
   a photographing section for photographing an object in which includes a valuable focal length lens; and
   an image processing section for image processing a photographed image with the calibration correction coefficient in accordance with a focal length of the valuable focal length lens when the photographed image was photographed.

6. A method of calibrating a zoom lens, comprising:
   photographing an area, in which reference marks for calibration are positioned, with a photographic device-to-be-calibrated whose focal length is set to a first focal length, and acquiring a first image-for-calibration;
   calculating a calibration correction coefficient for the first focal length, with the use of the photographed reference marks in the first image-for-calibration;
   photographing the area, in which the reference marks for calibration are positioned, with the photographic device-to-be-calibrated whose focal length is set to a second focal length in the vicinity of the first focal length, and acquiring a second image-for-calibration;
   inferring a positional relationship of the photographed reference marks for calibration in the second image-for-calibration, with the use of the photographed reference marks for calibration in the first image for calibration; and
   calculating a calibration correction coefficient for the second focal length, with the use of the photographed reference marks in the second image for calibration.

7. A calibrating apparatus for a zoom lens, comprising:
   a first image-acquiring section for acquiring a first image-for-calibration by photographing an area, in which reference marks for calibration are positioned, with a photographic device-to-be-calibrated whose focal length is set to a first focal length;
   a second image-acquiring section for acquiring a second image-for-calibration by photographing the area, in which the reference marks for calibration are positioned, with the photographic device-to-be-calibrated whose focal length is set to a second focal length;
   a correction coefficient calculating section for calculating a calibration correction coefficient for the first and second focal lengths and other focal lengths, with the use of the photographed reference marks in the first and second images-for-calibration.

8. The calibrating apparatus for a zoom lens of claim 7, wherein the other focal lengths are not used by any of image-acquiring sections.

9. A photographing apparatus for using the calibration correction coefficient obtained in claim 7, comprising:
   a photographing section for photographing an object in which includes a valuable focal length lens;
   image processing section for image processing a photographed image with the calibration correction coefficient in accordance with a focal length of the valuable focal length lens when the photographed image was photographed.

10. A calibrating apparatus for a zoom lens, comprising:

An image-acquiring section for acquiring a first image-for-calibration by photographing an area, in which reference marks for calibration are positioned, with a photographic device-to-be-calibrated whose focal length is set to a first focal length, and for acquiring a second image-for-calibration by photographing the area, in which the reference marks for calibration are positioned, with the photographic device-to-be-calibrated whose focal length is set to a second focal length;

a correction coefficient calculating section for calculating a calibration correction coefficient for the first and second focal lengths, with the use of the photographed reference marks in the first and second images-for-calibration; and a reference mark inferring section for inferring a positonal relationship of the photographed reference marks for calibration in the second image-for-calibration, with the use of the photographed reference marks for calibration in the first image-for-calibration.

11. The calibrating apparatus for a zoom lens of claim 10, wherein the photographic device-to-be-calibrated photographs the area, in which the reference marks for calibration are positioned, for each of a series of sequential focal lengths including the first and second focal lengths.

12. The calibrating apparatus for a zoom lens of claim 10, further comprising a reference mark position information database section for storing three-dimensional position information of the reference marks in the area in which they are positioned, wherein the reference mark inferring section comprises:

a duplicate reference mark extracting section for extracting a group of the reference marks matched between the photographed reference marks for calibrating in the first image-for-calibration and the photographed reference marks for calibration in the second image-for-calibration; and an additional reference mark position information extracting section for extracting, from the reference mark image in the second image-for-calibration, additional reference marks which any reference marks in the first image-for-calibration do not match, and for reading the three-dimensional position information relating to the additional reference marks with reference to the reference mark position information database section.

13. The calibrating apparatus for a zoom lens of claim 10, wherein the reference mark inferring section infers the positional relationship in the photographed reference marks for calibration in the second image-for-calibration with the use of information on positions of the reference marks for calibration projected in the first image-for-calibration and also information on the first and second focal lengths.

14. A photographing apparatus for using the calibration correction coefficient obtained in claim 10, comprising:

a photographing section for photographing an object in which includes a valuable focal length lens; and an image processing section for image processing a photographed image with the calibration correction coefficient in accordance with a focal length of the valuable focal length lens when the photograph image was photographed.

15. A calibrating apparatus for a zoom lens, comprising:

an image-acquiring section for acquiring a first image-for-calibrating by photographing an area, in which reference marks for calibration are positioned, with a photographic device-to-be-calibrated whose focal length is set to a first focal length, and for acquiring a second image-for-calibration by photographing the area, in which the reference marks for calibration are positioned, with the photographic device-to-be-calibrated whose focal length is set to a second focal length;

a correction coefficient calculating section for calculating a calibration correction coefficient for the first and second focal lengths and other focal lengths, with the use of the photographed reference marks in the first and second images-for-calibration.

16. The calibrating apparatus for a zoom lens of claim 15, wherein the other focal lengths are not used by any of image-acquiring sections.

17. A photographing apparatus for using the calibration correction coefficient obtained in claim 15, comprising:

a photographing section for photographing an object in which includes a valuable focal length lens;

image processing section for image processing a photographed image with the calibration correction coefficient in accordance with a focal length of the valuable focal length lens when the photographed image was photographed.

* * * * *